US011838911B2

(12) United States Patent
Xue et al.

(10) Patent No.: US 11,838,911 B2
(45) Date of Patent: Dec. 5, 2023

(54) TECHNIQUES FOR LOW-LATENCY SIDELINK FEEDBACK TRANSMISSION

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/407,857

(22) Filed: Aug. 20, 2021

(65) Prior Publication Data

US 2023/0056249 A1     Feb. 23, 2023

(51) Int. Cl.
*H04W 72/04* (2023.01)
*H04W 72/20* (2023.01)
(Continued)

(52) U.S. Cl.
CPC ......... *H04W 72/20* (2023.01); *H04L 27/2605* (2013.01); *H04W 72/0446* (2013.01)

(58) Field of Classification Search
CPC ... H04L 5/0048; H04L 5/0007; H04L 5/0044; H04L 5/0051; H04L 27/2602;
(Continued)

(56) References Cited

U.S. PATENT DOCUMENTS 11,411,688 B2 * 8/2022 Hwang ................. H04L 1/1887
11,463,204 B2 * 10/2022 Zhou .................... H04L 1/1819
(Continued)

FOREIGN PATENT DOCUMENTS

WO    WO-2021101196 A1    5/2021

OTHER PUBLICATIONS

International Search Report and Written Opinion—PCT/US2022/040561—ISA/EPO—dated Dec. 2, 2022.
(Continued)

*Primary Examiner* — Man U Phan
(74) *Attorney, Agent, or Firm* — Holland & Hart LLP

(57) ABSTRACT

Methods, systems, and devices for wireless communications are described. A first wireless device may receive control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot. Accordingly, the first wireless device may receive a sidelink data message on a first sidelink channel of the multiple sidelink channels and may transmit sidelink feedback information for the sidelink data message in the feedback channel sub-slot of the slot on a first feedback channel of the multiple feedback channels corresponding to the first sidelink channel. The described techniques may enable the first wireless device to transmit the sidelink feedback information with reduced latency and improved reliability.

30 Claims, 22 Drawing Sheets

(51) Int. Cl.
*H04L 27/26* (2006.01)
*H04W 72/0446* (2023.01)

(58) Field of Classification Search
CPC .............. H04L 1/0067; H04L 27/2613; H04L 27/2636; H04L 5/0053; H04L 27/2607; H04L 27/26; H04L 5/00; H04W 72/04; H04W 56/00; H04W 72/042; H04W 56/001; H04B 7/0626; H04B 7/06
USPC ......................................................... 370/336
See application file for complete search history.

(56) References Cited

U.S. PATENT DOCUMENTS

| | | | | |
|---|---|---|---|---|
| 2020/0154404 A1* | 5/2020 | Göktepe | ............... | H04L 1/1614 |
| 2020/0196279 A1* | 6/2020 | Thomas | .............. | H04W 74/002 |
| 2021/0204268 A1* | 7/2021 | Hassan Hussein | . | H04W 72/543 |
| 2021/0329431 A1* | 10/2021 | Su | .......................... | H04L 5/0094 |
| 2021/0409166 A1* | 12/2021 | Wang | ..................... | H04L 1/1864 |
| 2022/0095279 A1* | 3/2022 | Hwang | ................. | H04L 1/1822 |
| 2022/0167310 A1* | 5/2022 | Wang | .................... | H04L 1/1896 |
| 2022/0167312 A1* | 5/2022 | Lee | ....................... | H04L 1/1812 |
| 2022/0190970 A1* | 6/2022 | Hosseini | ............... | H04L 1/1812 |
| 2022/0210768 A1* | 6/2022 | Zhou | ........................ | H04W 4/40 |
| 2022/0264529 A1* | 8/2022 | Yang | ..................... | H04W 72/02 |
| 2022/0264585 A1* | 8/2022 | Yang | ..................... | H04L 1/1812 |
| 2022/0394702 A1* | 12/2022 | Lee | ....................... | H04L 1/1812 |
| 2023/0028000 A1* | 1/2023 | Si | .......................... | H04L 5/0094 |
| 2023/0036584 A1* | 2/2023 | Lee | ....................... | H04L 1/1854 |

OTHER PUBLICATIONS

Samsung: "On Physical Layer Procedures for NR V2X", 3GPP TSG RAN WG1 #98, R1-1908481 3rd Generation Partnership Project, Mobile Competence Centre, 650, Route Des Lucioles, F-06921 Sophia-Antipolis Cedex, vol. RAN WG1, No. Prague, CZ, Aug. 26, 2019-Aug. 30, 2019 Aug. 17, 2019, XP051765090, 20 Pages.

Samsung: "On Sidelink HARQ Procedure", 3GPP TSG RAN WG1 #97, R1-1906948, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051728398, 11 Pages, Section 3.

* cited by examiner

TECHNIQUES FOR LOW-LATENCY SIDELINK FEEDBACK TRANSMISSION

TECHNICAL FIELD

The following relates to wireless communications, including techniques for low-latency sidelink feedback transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). Components within a wireless communication system may be coupled (for example, operatively, communicatively, functionally, electronically, and/or electrically) to each other.

A wireless multiple-access communications system may include one or more base stations or one or more network access nodes, each simultaneously supporting communication for multiple communication devices, which may be otherwise known as user equipment (UE). A first communication device may transmit a message to a second communication device on a sidelink channel, and the second communication device may transmit feedback information for the message on a feedback channel. In some cases, however, the second communication device may have a limited number of opportunities to transmit the feedback information. Additionally, there may be a delay between when the first communication device receives the message and when the first communication device transmits the feedback information, which may increase the latency associated with transmitting the feedback information.

SUMMARY

The described techniques relate to improved methods, systems, devices, and apparatuses that support techniques for low-latency sidelink feedback transmission. Generally, the described techniques provide for using a sidelink resource pool to improve sidelink feedback reporting. A first wireless device may receive control signaling indicating multiple sidelink channels of a sidelink resource pool, a mapping between each sidelink channel of the multiple sidelink channels to a corresponding feedback channel of multiple feedback channels in the sidelink resource pool, and a time gap between sidelink channel transmission and feedback transmission with respect to a feedback channel sub-slot of multiple feedback channel sub-slots within a slot. Accordingly, the first wireless device may receive a sidelink data message on a first sidelink channel of the multiple sidelink channels and may transmit sidelink feedback information for the sidelink data message in the feedback channel sub-slot of the slot on a first feedback channel of the multiple feedback channels corresponding to the first sidelink channel. The described techniques may enable the first wireless device to transmit the sidelink feedback information with reduced latency and improve reliability, among other benefits.

A method for wireless communications at a first wireless device is described. The method may include receiving control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, receiving a sidelink data message on a first sidelink channel of the multiple sidelink channels, and transmitting, in accordance with the mapping and the time gap, sidelink feedback information for the sidelink data message in the feedback channel sub-slot of the slot on a first feedback channel of the multiple feedback channels corresponding to the first sidelink channel.

An apparatus for wireless communications at a first wireless device is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to receive control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, receive a sidelink data message on a first sidelink channel of the multiple sidelink channels, and transmit, in accordance with the mapping and the time gap, sidelink feedback information for the sidelink data message in the feedback channel sub-slot of the slot on a first feedback channel of the multiple feedback channels corresponding to the first sidelink channel.

Another apparatus for wireless communications at a first wireless device is described. The apparatus may include means for receiving control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, means for receiving a sidelink data message on a first sidelink channel of the multiple sidelink channels, and means for transmitting, in accordance with the mapping and the time gap, sidelink feedback information for the sidelink data message in the feedback channel sub-slot of the slot on a first feedback channel of the multiple feedback channels corresponding to the first sidelink channel.

A non-transitory computer-readable medium storing code for wireless communications at a first wireless device is described. The code may include instructions executable by at least one processor to receive control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, receive a sidelink data message on a first sidelink channel of the multiple sidelink channels, and transmit, in accordance with the mapping and the time gap, sidelink feedback information for the sidelink data message in the feedback channel sub-slot of the slot on a first feedback channel of the multiple feedback channels corresponding to the first sidelink channel.

In some examples of the method, apparatuses, and non-transitory computer-readable medium described herein, at least one sidelink channel of the multiple sidelink channels may be frequency division multiplexed (FDM-ed) with at least one feedback channel of the multiple feedback channels.

In some examples of the method, apparatuses, and non-transitory computer-readable medium described herein, transmitting the sidelink feedback information may include operations, features, means, or instructions for transmitting the sidelink feedback information for the sidelink data message on the first feedback channel and on a second feedback channel of the multiple feedback channels corresponding to the first sidelink channel.

In some examples of the method, apparatuses, and non-transitory computer-readable medium described herein, transmitting the sidelink feedback information may include operations, features, means, or instructions for transmitting the sidelink feedback information that is cyclically shifted.

In some examples of the method, apparatuses, and non-transitory computer-readable medium described herein, transmitting the sidelink feedback information may include operations, features, means, or instructions for transmitting, on the first feedback channel, the sidelink feedback information that is code division multiplexed (CDM-ed) with second sidelink feedback information for a second sidelink data message.

In some examples of the method, apparatuses, and non-transitory computer-readable medium described herein, receiving the sidelink data message may include operations, features, means, or instructions for receiving sidelink control information (SCI) that may be multiplexed with the sidelink data message, where the SCI includes an indication of a second time gap between sidelink channel transmission and feedback transmission with respect to a second feedback channel sub-slot of the multiple feedback channel sub-slots.

In some examples of the method, apparatuses, and non-transitory computer-readable medium described herein, transmitting the sidelink feedback information may include operations, features, means, or instructions for transmitting, in accordance with the time gap, a first repetition of the sidelink feedback information on the first feedback channel in the feedback channel sub-slot and transmitting, in accordance with the second time gap, a second repetition of the sidelink feedback information on the first feedback channel in the second feedback channel sub-slot.

In some examples of the method, apparatuses, and non-transitory computer-readable medium described herein, transmitting the sidelink feedback information may include operations, features, means, or instructions for transmitting first sidelink feedback information for a first portion of the sidelink data message on the first feedback channel in the feedback channel sub-slot based on a first attempt to perform early decoding of the sidelink data message and transmitting second sidelink feedback information for a second portion of the sidelink data message on the first feedback channel in a second feedback channel sub-slot of the multiple feedback channel sub-slots based on a second attempt to perform early decoding of the sidelink data message.

In some examples of the method, apparatuses, and non-transitory computer-readable medium described herein, receiving the sidelink data message may include operations, features, means, or instructions for receiving an indication of a symbol length for the sidelink data message, where the sidelink data message may be received based on the symbol length.

In some examples of the method, apparatuses, and non-transitory computer-readable medium described herein, transmitting the sidelink feedback information may include operations, features, means, or instructions for transmitting a filler waveform on the first feedback channel in a first set of one or more feedback channel sub-slots of the multiple feedback channel sub-slots and transmitting one or more instances of the sidelink feedback information on the first feedback channel in a second set of one or more feedback channel sub-slots of the multiple feedback channel sub-slots.

Some examples of the method, apparatuses, and non-transitory computer-readable medium described herein may further include operations, features, means, or instructions for receiving a second sidelink data message on a second sidelink channel of the multiple sidelink channels, transmitting the sidelink feedback information for the sidelink data message on the first feedback channel in a first set of one or more feedback channel sub-slots of the multiple feedback channel sub-slots, and transmitting second sidelink feedback information for the second sidelink data message on a second feedback channel of the multiple feedback channels corresponding to the second sidelink channel in a second set of one or more feedback channel sub-slots of the multiple feedback channel sub-slots.

In some examples of the method, apparatuses, and non-transitory computer-readable medium described herein, transmitting the sidelink feedback information may include operations, features, means, or instructions for transmitting multiple repetitions of the sidelink feedback information on the first feedback channel in two or more of the multiple feedback channel sub-slots, where each feedback channel sub-slot of the multiple feedback channel sub-slots includes one or more symbol periods.

In some examples of the method, apparatuses, and non-transitory computer-readable medium described herein, the control signaling includes a system information block (SIB), radio resource control (RRC) signaling, SCI, a medium access control (MAC) control element, or a combination thereof.

In some examples of the method, apparatuses, and non-transitory computer-readable medium described herein, each feedback channel of the multiple feedback channels includes at least a physical resource block (PRB) within a feedback resource pool.

In some examples of the method, apparatuses, and non-transitory computer-readable medium described herein, receiving the control signaling may include operations, features, means, or instructions for receiving, from a second wireless device, control signaling indicating a time gap for each communication link of multiple communication links between the first wireless device and the second wireless device, a time gap for each physical sidelink shared channel (PSSCH) instance of multiple PSSCH instances, or a combination thereof.

A method for wireless communications at a first wireless device is described. The method may include communicating control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, transmitting a sidelink data message on a first sidelink channel of the multiple sidelink channels, and receiving, in accordance with the mapping and the time gap, sidelink feedback information for the sidelink data message in the feedback channel sub-slot of the slot on a first feedback channel of the multiple feedback channels corresponding to the first sidelink channel.

An apparatus for wireless communications at a first wireless device is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to communicate control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, transmit a sidelink data message on a first sidelink channel of the multiple sidelink channels, and receive, in accordance with the mapping and the time gap, sidelink feedback information for the sidelink data message in the feedback channel sub-slot of the slot on a first feedback channel of the multiple feedback channels corresponding to the first sidelink channel.

Another apparatus for wireless communications at a first wireless device is described. The apparatus may include means for communicating control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, means for transmitting a sidelink data message on a first sidelink channel of the multiple sidelink channels, and means for receiving, in accordance with the mapping and the time gap, sidelink feedback information for the sidelink data message in the feedback channel sub-slot of the slot on a first feedback channel of the multiple feedback channels corresponding to the first sidelink channel.

A non-transitory computer-readable medium storing code for wireless communications at a first wireless device is described. The code may include instructions executable by at least one processor to communicate control signaling indicating multiple sidelink channels of a sidelink resource pool, a mapping between each sidelink channel of the multiple sidelink channels to a corresponding feedback channel of multiple feedback channels, and a time gap between sidelink channel transmission and feedback transmission with respect to a feedback channel sub-slot of multiple feedback channel sub-slots within a slot, transmit a sidelink data message on a first sidelink channel of the multiple sidelink channels, and receive, in accordance with the mapping and the time gap, sidelink feedback information for the sidelink data message in the feedback channel sub-slot of the slot on a first feedback channel of the multiple feedback channels corresponding to the first sidelink channel.

In some examples of the method, apparatuses, and non-transitory computer-readable medium described herein, communicating the control signaling may include operations, features, means, or instructions for transmitting, to a second wireless device, the control signaling indicating the mapping and the time gap.

In some examples of the method, apparatuses, and non-transitory computer-readable medium described herein, communicating the control signaling may include operations, features, means, or instructions for receiving, from a second wireless device, the control signaling indicating the mapping and the time gap.

In some examples of the method, apparatuses, and non-transitory computer-readable medium described herein, at least one sidelink channel of the multiple sidelink channels may be FDM-ed with at least one feedback channel of the multiple feedback channels.

In some examples of the method, apparatuses, and non-transitory computer-readable medium described herein, receiving the sidelink feedback information may include operations, features, means, or instructions for receiving, on the first feedback channel, the sidelink feedback information that may be CDM-ed with second sidelink feedback information for a second sidelink data message.

In some examples of the method, apparatuses, and non-transitory computer-readable medium described herein, transmitting the sidelink data message may include operations, features, means, or instructions for transmitting SCI that may be multiplexed with the sidelink data message, where the SCI includes an indication of a second time gap between sidelink channel transmission and feedback transmission with respect to a second feedback channel sub-slot of the multiple feedback channel sub-slots.

In some examples of the method, apparatuses, and non-transitory computer-readable medium described herein, receiving the sidelink feedback information may include operations, features, means, or instructions for receiving, in accordance with the time gap, a first repetition of the sidelink feedback information on the first feedback channel in the feedback channel sub-slot and receiving, in accordance with the second time gap, a second repetition of the sidelink feedback information on the first feedback channel in the second feedback channel sub-slot.

In some examples of the method, apparatuses, and non-transitory computer-readable medium described herein, receiving the sidelink feedback information may include operations, features, means, or instructions for receiving a filler waveform on the first feedback channel in a first set of one or more feedback channel sub-slots of the multiple feedback channel sub-slots and receiving one or more instances of the sidelink feedback information on the first feedback channel in a second set of one or more feedback channel sub-slots of the multiple feedback channel sub-slots.

In some examples of the method, apparatuses, and non-transitory computer-readable medium described herein, receiving the sidelink feedback information may include operations, features, means, or instructions for receiving the sidelink feedback information on the first feedback channel and on a second feedback channel of the multiple feedback channels corresponding to the first sidelink channel.

In some examples of the method, apparatuses, and non-transitory computer-readable medium described herein, receiving the sidelink feedback information may include operations, features, means, or instructions for receiving multiple repetitions of the sidelink feedback information on the first feedback channel in the multiple feedback channel sub-slots, where each feedback channel sub-slot of the multiple feedback channel sub-slots includes one or more symbol periods.

In some examples of the method, apparatuses, and non-transitory computer readable medium described herein, transmitting the sidelink data message may include operations, features, means, or instructions for transmitting the sidelink data message on the first sidelink channel in a first set of one or more sidelink channel sub-slots within a second slot, where the sidelink data message includes an indication of a symbol length for the sidelink data message and transmitting one or more padding bits on the first sidelink channel in a second set of one or more sidelink channel sub-slots within the second slot.

In some examples of the method, apparatuses, and non-transitory computer readable medium described herein, the control signaling includes a SIB, RRC signaling, SCI, a MAC control element, or a combination thereof.

DETAILED DESCRIPTION

Figure 1:
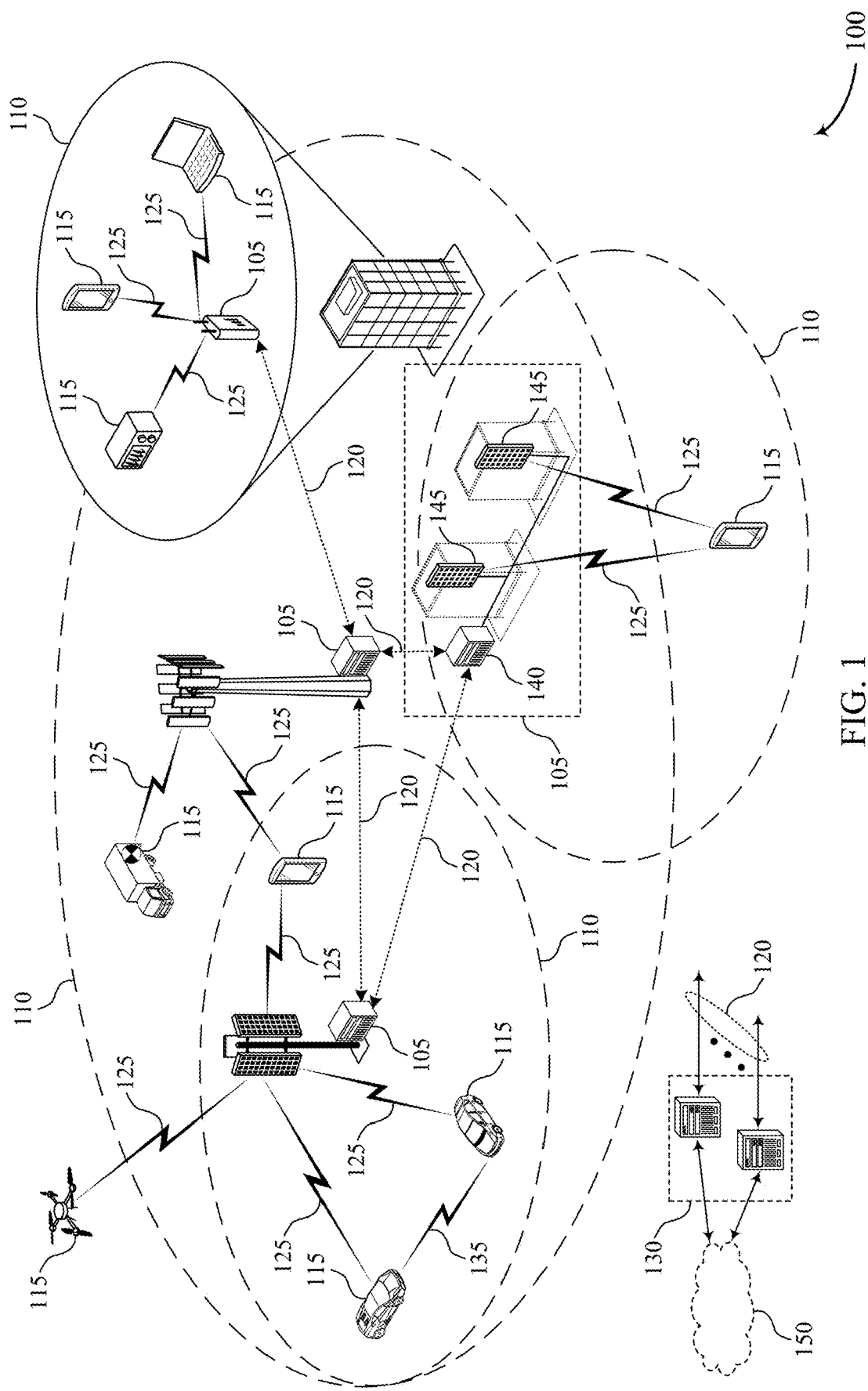
FIGS. 1 and 2 illustrate examples of wireless communications systems that support techniques for low-latency sidelink feedback transmission in accordance with aspects of the present disclosure.

A first wireless device (e.g., a user equipment (UE)) may receive a sidelink data message from a second wireless device on a physical sidelink shared channel (PSSCH), and may transmit feedback information (e.g., hybrid automatic repeat request (HARQ) feedback) for the sidelink data message on a physical sidelink feedback channel (PSFCH). In some cases, however, the first wireless device may have a limited number of opportunities to transmit the feedback information, and there may be a delay between when the first wireless device receives the sidelink data message and when the first wireless device transmits the feedback information. Additionally, the first wireless device may be unable to transmit more than one repetition of the feedback information, which may reduce the likelihood of the second wireless device successfully receiving the feedback information. Thus, conventional sidelink feedback reporting techniques may not support ultra-reliable low-latency communications (URLLC) between the first wireless device and the second wireless device.

In accordance with the described techniques, the first wireless device may be configured to transmit the feedback information using PSFCH resources of a sidelink resource pool, which may enable the first wireless device to transmit the feedback information with reduced latency and improved reliability, among other benefits. Specifically, the sidelink resource pool may be configured such that the feedback information can be multiplexed (e.g., using frequency-division multiplexing (FDM) or code-division multiplexing (CDM)) with other sidelink transmissions (e.g., PSSCH transmissions, PSFCH transmissions). As an example, the first wireless device may receive an indication of a sidelink resource pool that includes one or more available PSFCH resources. Accordingly, if the first wireless device receives a sidelink data message from the second wireless device, the first wireless device may transmit feedback information for the sidelink message using one or more available PSFCH resources of the sidelink resource pool.

To support transmission of the feedback information using the sidelink resource pool, the first wireless device may be configured with a mapping between sidelink channels (e.g., PSSCHs) and feedback channels (e.g., PSFCHs) of the sidelink resource pool. If, for example, the first wireless device receives the sidelink data message from the second wireless device on a first sidelink channel, the first wireless device may use the mapping to identify one or more feedback channels that correspond to the first sidelink channel, and may use the identified one or more feedback channels to transmit the feedback information. The first wireless device may also be configured with a time gap between sidelink data transmission (e.g., when the second wireless device transmits the sidelink data message) and sidelink feedback transmission (e.g., when the first wireless device transmits the feedback information). The first wireless device may determine when to transmit the feedback information based on the time gap and a last sub-slot in which the wireless device receives the sidelink data message from the second wireless device.

The sidelink resource pool may be configured such that the first wireless device can transmit the feedback information with reduced latency and improved reliability, among other benefits. For example, the sidelink resource pool may be configured such that the feedback information can be multiplexed with other sidelink transmissions (e.g., PSSCH transmissions, PSFCH transmissions), which may provide a greater number of opportunities for the first wireless device to transmit the feedback information. Additionally, the sidelink resource pool may be configured such that the first wireless device can transmit multiple repetitions of the feedback information (e.g., in multiple sub-slots or physical resource blocks (PRBs)), which may increase the likelihood of the second wireless device successfully receiving the feedback information.

Aspects of the disclosure are initially described in the context of wireless communications systems, resource mapping schemes, communication schemes, resource diagrams, and process flows. Aspects of the disclosure are further illustrated by and described with reference to apparatus diagrams, system diagrams, and flowcharts that relate to techniques for low-latency sidelink feedback transmission.

FIG. 1 illustrates an example of a wireless communications system 100 that supports techniques for low-latency sidelink feedback transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or a machine type communication (MTC) device, or the like, which may be implemented in various articles such as appliances, drones, robots, vehicles, meters, or the like. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs 115. MTC or IoT UEs 115 may include MTC/enhanced MTC (eMTC, also referred to as category (CAT)-M, Cat M1) UEs 115, NB-IoT (also referred to as CAT NB1) UEs 115, as well as other types of UEs 115. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support NR sidelink operations between wireless devices. For example, some V2X communications systems may support NR sidelink operations for distributing safety messages among nearby UEs 115 in a radio frequency spectrum band (e.g., a sub-6 GHz licensed radio frequency spectrum band). In such wireless communications systems, UEs 115 may be configured with various radio resource allocation or channel access modes. For example, a UE 115 in a first mode (e.g., Mode 1 for in-coverage deployment) may receive a grant from a base station for channel access, and a UE 115 in a second mode (e.g., Mode 2 for autonomous deployment) may use channel sensing to perform distributed channel access.

In some cases, HARQ feedback may be employed to improve the reliability of unicast and groupcast transmissions. For example, a first UE 115 (e.g., a transmitting UE 115) may transmit a sidelink message (e.g., a PSSCH transmission) to a second UE 115 and may request a HARQ response from the second UE 115 (e.g., a receiving UE 115) via sidelink control information (SCI). In some cases, the SCI may carry a layer-one (L1) source identifier (ID) and an L1 destination ID. Accordingly, the second UE 115 may conduct blind SCI decoding within a resource pool and may identify the second UE 115 as the intended receiver of the SCI if, for example, the L1 destination ID in the SCI matches with a least significant bit (e.g., a least significant bit 16-$b$) from a sidelink layer-two (L2) ID of the second UE 115. As the intended receiver of the SCI, the second UE 115 may transmit a HARQ response using a PSFCH resource with an index that is based on a time-frequency location of the sidelink message and the L1 source ID included in the SCI. The PSFCH resource index may also be based on a groupcast member ID of the second UE 115.

In some instances, new vertical domains may be used for sidelink communication (e.g., NR SL). Not every vertical domain has access to sub-6 GHz licensed band, and vertical domains having access to sub-6 GHz licensed band may also seek opportunities over an unlicensed band. For example, there is approximately 1.8 GHz available in the 5 GHz/6 GHz unlicensed band and approximately 7 GHz in the 60 GHz unlicensed band. Such wider bandwidth may permit different deployment scenarios and use cases than those were considered previously that were developed assuming limited bandwidth in the licensed spectrum. In some examples, low latency may be deployed for sidelink communication (e.g., NR SL) in some new verticals, and may also include deployments over an unlicensed band.

Some wireless communications systems may support NR sidelink operations in both licensed radio frequency spectrum bands (e.g., sub-6 GHz radio frequency spectrum bands) and unlicensed radio frequency spectrum bands, as some deployments may be unable to access licensed radio frequency spectrum bands, and other deployments with access to these licensed radio frequency spectrum bands may benefit from using unlicensed radio frequency spectrum bands. Some unlicensed radio frequency spectrum bands (e.g., 5 GHz and 6 GHz unlicensed radio frequency spectrum bands) may have relatively large available bandwidth sizes (e.g., approximately 1.8 GHz of unused bandwidth), which may support different deployment scenarios (e.g., in comparison to licensed radio frequency spectrum bands).

Some such deployment scenarios, such as URLLC, may be associated with relatively low latency thresholds. In some cases, however, sidelink NR HARQ response timelines may have a relatively coarse granularity (e.g., one HARQ response opportunity per slot and at fixed symbol positions), which may not satisfy these latency thresholds. Specifically, HARQ for sidelink NR may use slot-level timing, which may not comply with URLLC latency thresholds. In some cases, to reduce HARQ response timelines and provide greater support for URLLC, a wireless communications system may support symbol-level timing, as described with reference to FIG. 4.

Figure 2:
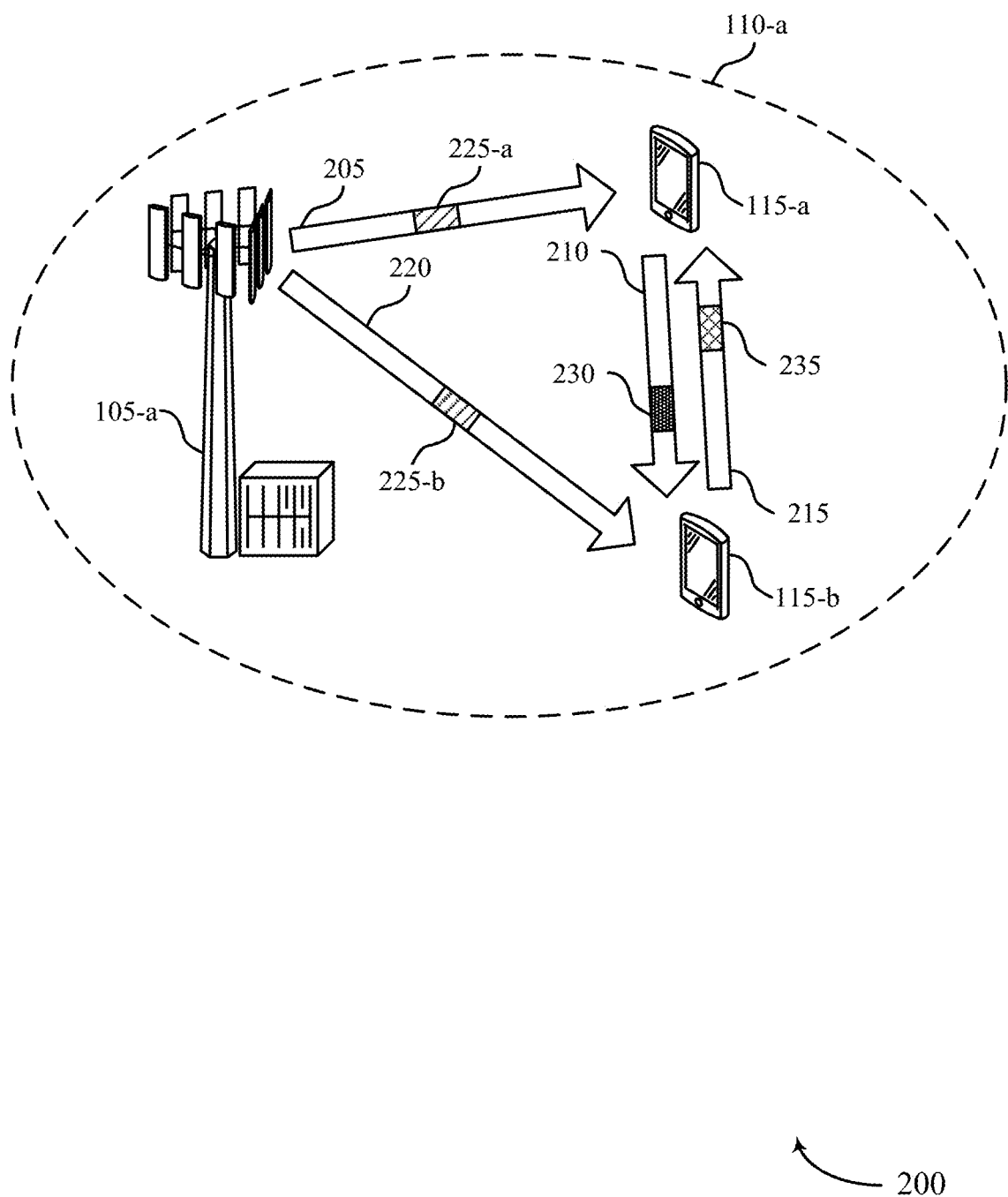

FIG. 2 illustrates an example of a wireless communications system 200 that supports techniques for low-latency sidelink feedback transmission in accordance with aspects of the present disclosure. The wireless communications system may implement or be implemented by aspects of the wireless communications system 100 as described with reference to FIG. 1. For example, the wireless communications system 200 may include a base station 105-a, a UE 115-a, and a UE 115-b, which may be examples of a base station 105 and a UE 115 as described with reference to FIG. 1. The base station 105-a may serve a geographic coverage area 110-a, which may be an example of a geographic coverage area 110 as described with reference to FIG. 1. In the wireless communications system 200, the UE 115-b may transmit feedback information 235 for a sidelink data message 230 in accordance with control signaling 225-b.

In the example of FIG. 2, the base station 105-a may transmit control signaling 225-a to the UE 115-a over a communication link 205 (e.g., a first downlink channel), and may transmit the control signaling 225-b to the UE 115-b over a communication link 220 (e.g., a second downlink channel). The control signaling may indicate a sidelink resource pool, a resource mapping for the sidelink resource pool, a time gap for sidelink feedback transmission, or a combination thereof. Accordingly, the UE 115-a may transmit the sidelink data message 230 (e.g., a PSSCH transmission) to the UE 115-b over a communication link 210 (e.g., a PSSCH) and the UE 115-b may transmit the feedback information 235 (e.g., HARQ feedback) for the sidelink data message 230 to the UE 115-a over a communication link 215 (e.g., a PSFCH from the sidelink resource pool).

The UE 115-b may transmit the feedback information 235 in accordance with the control signaling 225-b. For example, the UE 115-b may determine that the communication link 215 corresponds to the communication link 210 based on the resource mapping in the control signaling 225-b, and may transmit the feedback information 235 accordingly. Likewise, the UE 115-b may identify a slot (or sub-slot) in which to transmit the feedback information 235 based on the time gap in the control signaling 225-b and a last sub-slot in which the UE 115-b receives the sidelink data message 230. In some examples, the sidelink data message 230 may include SCI (e.g., piggyback SCI) that indicates a second time gap. In such examples, the UE 115-b may transmit a first iteration of the feedback information 235 in accordance with the time gap (e.g., from the control signaling 225-b), and may transmit a second iteration of the feedback information 235 in accordance with the second time gap (e.g., from the sidelink data message 230). Additionally or alternatively, the UE 115-b may attempt to perform early decoding on the sidelink data message 230 and may transmit multiple instances of the feedback information 235 based on the early decoding attempts.

In some examples, the sidelink resource pool may be configured such that the communication link 210 overlaps (e.g., in the time domain) with one or more PSSCHs or PSFCHs. That is, the feedback information 235 may be multiplexed (e.g., using FDM) with one or more sidelink transmissions (e.g., from other sidelink devices). Additionally or alternatively, the UE 115-b may apply a cyclic shift to the feedback information 235 such that the feedback information 235 and the one or more sidelink transmissions can be transmitted on the same time and frequency resources (e.g., using CDM). That is, the feedback information 235 and the one or more sidelink transmissions may be transmitted with different cyclic shifts such that a receiving device (e.g., the UE 115-a) can distinguish between the feedback information 235 and the one or more sidelink transmissions.

The wireless communications system 200 may support techniques for improved sidelink feedback reporting between the UE 115-a and the UE 115-b. For example, the described techniques may enable the UE 115-b to transmit sidelink feedback information to the UE 115-a using one or more PSFCH resources of a sidelink resource pool. The sidelink resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the UE 115-b to transmit the sidelink feedback information. As such, the sidelink resource pool may enable the UE 115-b to transmit the sidelink feedback information with reduced latency, among other benefits. In addition, the sidelink resource pool may be configured such that the UE 115-b can transmit multiple repetitions of the sidelink feedback information (e.g., in multiple sub-slots or PRBs), which may increase the likelihood of the UE 115-a successfully receiving the sidelink feedback information.

Figure 3:
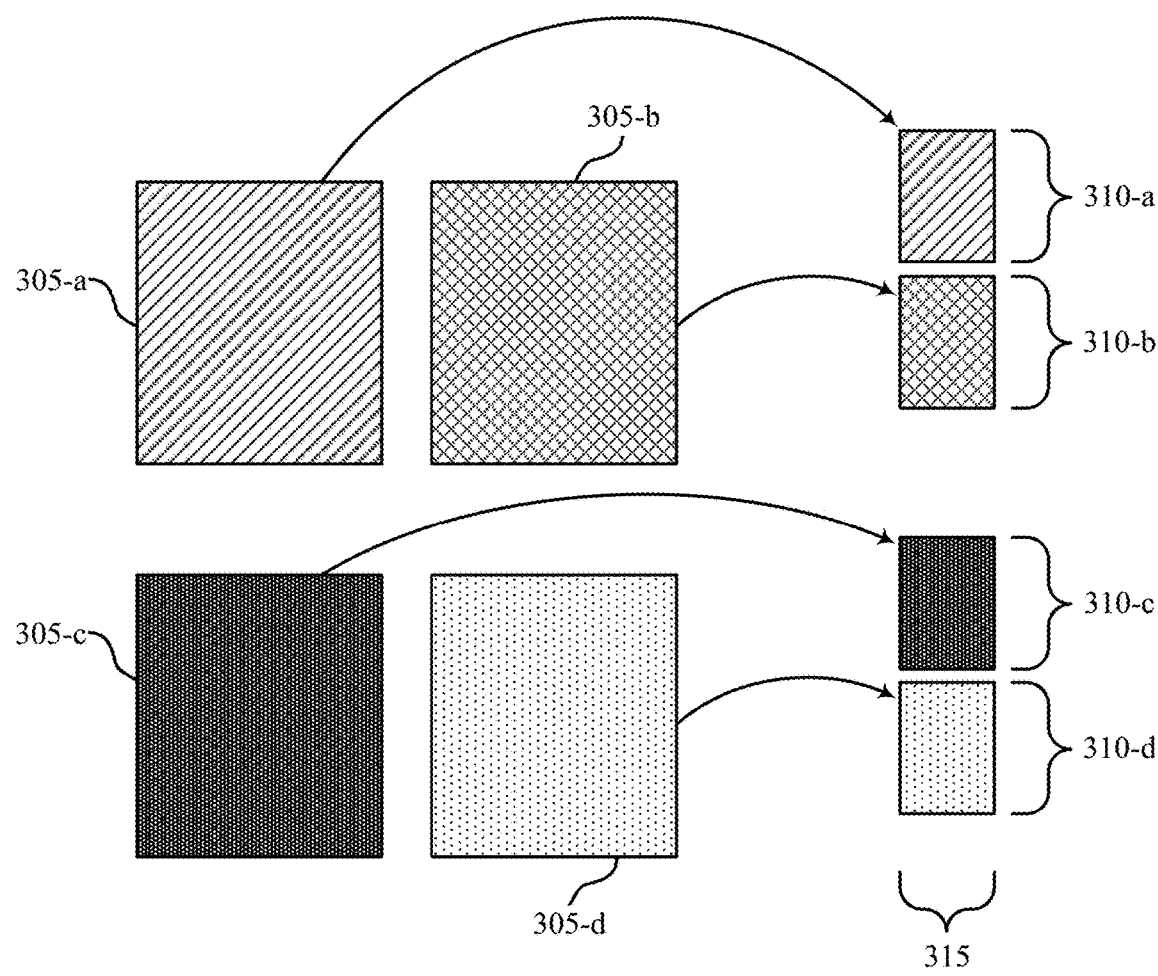
FIG. 3 illustrates an example of a resource mapping scheme that supports techniques for low-latency sidelink feedback transmission in accordance with aspects of the present disclosure.

FIG. 3 illustrates an example of a resource mapping scheme 300 that supports techniques for low-latency sidelink feedback transmission in accordance with aspects of the present disclosure. The resource mapping scheme 300 may implement or be implemented by aspects of the wireless communications system 100 and the wireless communications system 200 as described with reference to FIGS. 1 and 2, respectively. For example, the resource mapping scheme 300 may implement or be implemented by a base station or a UE, which may be examples of a base station or a UE as described with reference to FIGS. 1 and 2. The resource mapping scheme 300 may illustrate a mapping between PSSCH transmissions 305 and PRBs 310.

In the example of FIG. 3, each of the PSSCH transmissions 305 may be mapped one or more PRBs 310 of a PSFCH 315 (e.g., each PSSCH is mapped to Z-PRBs of the PSFCH 315). For example, a PSSCH transmission 305-*a* may be mapped to a PRB 310-*a*, a PSSCH transmission 305-*b* may be mapped to a PRB 310-*b*, a PSSCH transmission 305-*c* may be mapped to a PRB 310-*c*, and a PSSCH transmission 305-*d* may be mapped to a PRB 310-*d*. Thus, a UE that receives the PSSCH transmission 305-*b* may be configured to transmit HARQ feedback for the PSSCH transmission 305-*b* in the PRB 310-*b* of the PSFCH 315.

Each of the PRBs 310 may be configured to carry a first number (e.g., Z*Y) of PSFCH sequences for PSFCH feedback. The first number of PSFCH sequences may be based on a second number (e.g., Y) that is within a range (e.g., {1,2,3,4,6}) that pertains to a number of possible cyclic shifts (e.g., dimensions in the code domain). A UE that receives one of the PSSCH transmissions 305 may select a sequence with an index of (K+M)mod(Z*Y)), where K may represent an 8-bit L1 source ID and M may represent a member ID for groupcast HARQ response option 2 (which may be within {0,1, . . . X−1}). Alternatively, M may be set to a preconfigured value (e.g., 0). In some examples, groupcast HARQ response option 2 (e.g., respective responses for different receiving UEs) may not be used if a specific criteria is satisfied (e.g., X>(Z*Y)). The UE may use the selected sequence for transmitting feedback in one or more PRBs 310 of the PSFCH 315 that correspond to a sub-channel in which a corresponding PSSCH transmission 305 was communicated.

The resource mapping scheme 300 may support techniques for improved sidelink feedback reporting between wireless devices. For example, the described techniques may enable a first wireless device to transmit sidelink feedback information to a second wireless device using one or more PSFCH resources of a sidelink resource pool. The sidelink resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the first wireless device to transmit the sidelink feedback information. As such, the sidelink resource pool may enable the first wireless device to transmit the sidelink feedback information with reduced latency, among other benefits. In addition, the sidelink resource pool may be configured such that the first wireless device can transmit multiple repetitions of the sidelink feedback information (e.g., in multiple sub-slots or PRBs), which may increase the likelihood of the second wireless device successfully receiving the sidelink feedback information.

Figure 4:
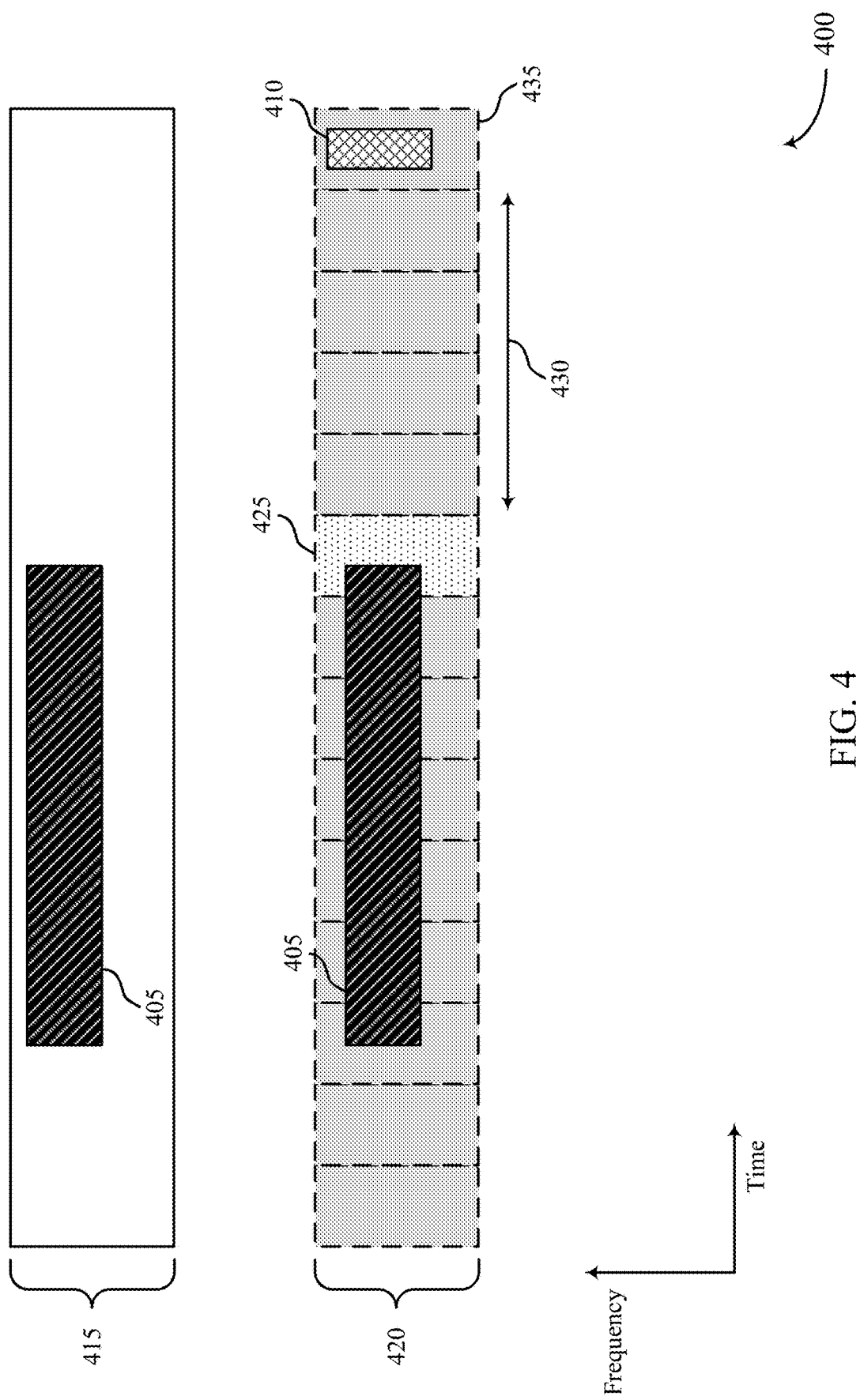
FIG. 4 illustrates an example of a communication scheme that supports techniques for low-latency sidelink feedback transmission in accordance with aspects of the present disclosure.

FIG. 4 illustrates an example of a communication scheme 400 that supports techniques for low-latency sidelink feedback transmission in accordance with aspects of the present disclosure. The communication scheme 400 may implement or be implemented by aspects of the wireless communications system 100 and the wireless communications system 200 as described with reference to FIGS. 1 and 2, respectively. For example, the communication scheme 400 may implement or be implemented by a base station or a UE, which may be examples of a base station or a UE as described with reference to FIGS. 1 and 2. In the communication scheme 400, a UE may transmit a physical uplink control channel (PUCCH) transmission 410 (e.g., HARQ feedback) for a physical downlink shared channel (PDSCH) transmission 405 using a sub-slot level HARQ response timeline.

In the example of FIG. 4, a UE may receive the PDSCH transmission 405 from a base station on a downlink component carrier 415, which may be associated with a first subcarrier spacing of 15 kHz. Accordingly, the UE may transmit the PUCCH transmission 410 to the base station on an uplink component carrier 420, which may be associated with a second subcarrier spacing of 30 kHz. The UE may determine when to transmit the PUCCH transmission 410 based on a time gap 430. The time gap 430 may start from a sub-slot corresponding to a last symbol 425 of the PDSCH transmission 405. Thus, the UE may determine to transmit the PUCCH transmission 410 in a symbol 435 (or a sub-slot) based on the last symbol 425 of the PDSCH transmission 405 and the time gap 430.

The communication scheme 400 may illustrate an example of a sub-slot level HARQ response. In such examples, PUCCH resources may be configured per sub-slot, which may include 2 or 7 symbols. In some cases, the UE may only be able to transmit a single HARQ response (e.g., PUCCH transmission) for a mini-slot downlink transmission (e.g., PDSCH transmission) per slot. In other cases, multiple PUCCHs (e.g., for HARQ-ACK) can be transmitted within a slot. In some cases, to support sub-slot level HARQ responses, a granularity of the time gap 430 (e.g., K1) can be configured to be the same as the sub-slot length (e.g., 2 or 7 symbols).

Although illustrated with respect to downlink and uplink communications, it is to be understood that the communication scheme 400 may also be used to improve sidelink communications. For example, the described techniques may enable a first wireless device to transmit sidelink feedback information to a second wireless device using a sub-slot level HARQ response timeline, which may enable the first wireless device to transmit the sidelink feedback information with reduced latency, among other benefits. In addition, the described techniques may enable the first wireless device can transmit multiple repetitions of the sidelink feedback information (e.g., in multiple sub-slots or PRBs), which may increase the likelihood of the second wireless device successfully receiving the sidelink feedback information.

Figure 5:
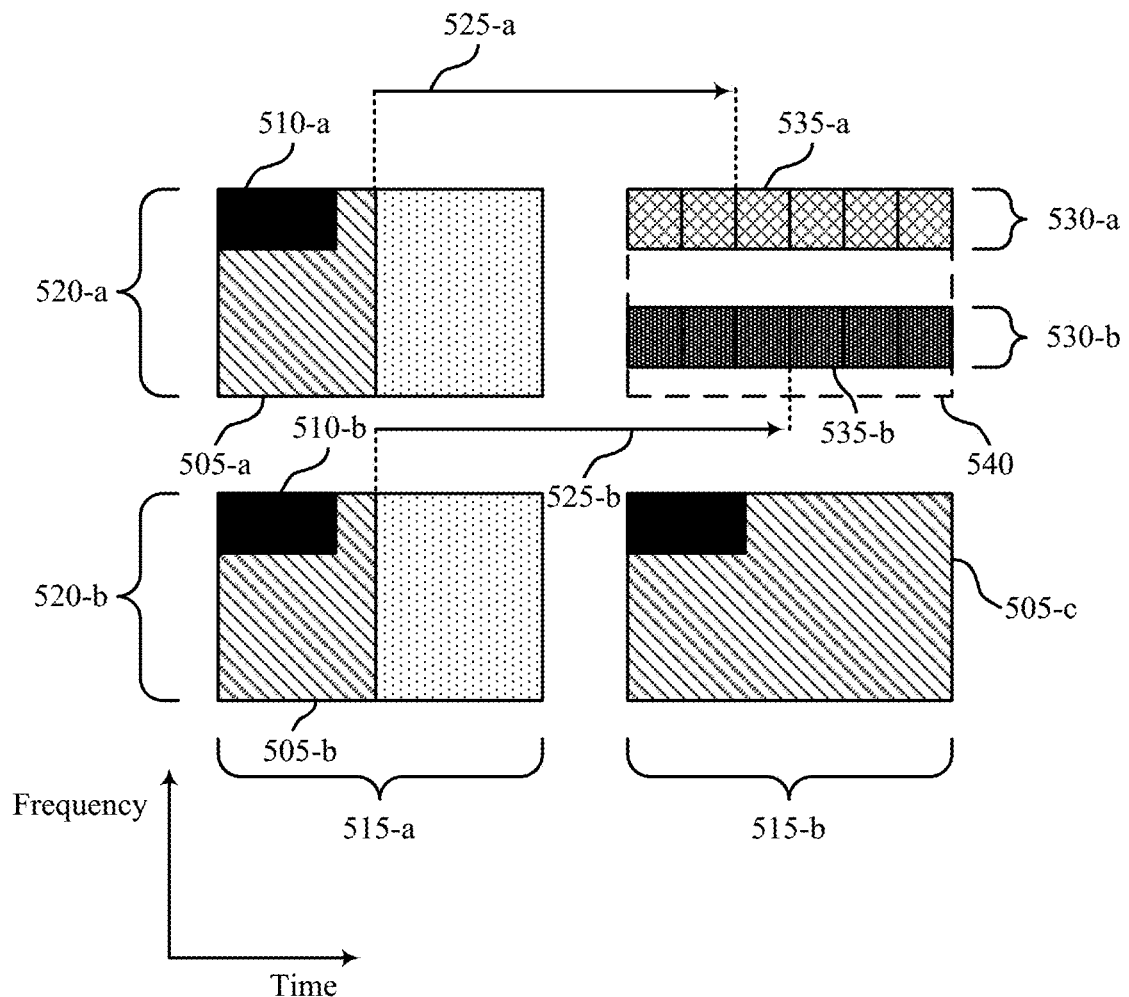
FIGS. 5 through 7 illustrate examples of resource mapping schemes that support techniques for low-latency sidelink feedback transmission in accordance with aspects of the present disclosure.

FIG. 5 illustrates an example of a resource mapping scheme 500 that supports techniques for low-latency sidelink feedback transmission in accordance with aspects of the present disclosure. The resource mapping scheme 500 may implement or be implemented by aspects of the wireless communications system 100 and the wireless communications system 200 as described with reference to FIGS. 1 and 2, respectively. For example, the resource mapping scheme 500 may implement or be implemented by a base station or a UE, which may be examples of a base station or a UE as described with reference to FIGS. 1 and 2. The resource mapping scheme 500 may illustrate a mapping between PSSCH transmissions 505 and PSFCH resources 510.

In the example of FIG. 5, a UE may receive a PSSCH transmission 505-*a* on a sub-channel 520-*a* during a slot 515-*a*. The PSSCH transmission 505-*a* may be multiplexed with SCI 510-*a*, which may indicate a time gap 525-*a* (e.g., K1) between a last sub-slot of the PSSCH transmission 505-*a* and a sub-slot 535-*a* of a slot 515-*b* in which the UE is scheduled to transmit HARQ feedback for the PSSCH transmission 505-*a*. In some examples, a slot 515 may include multiple symbol periods, and a sub-slot 535 may include one or more symbol periods. The UE may transmit the HARQ feedback for the PSSCH transmission 505-*a* in the sub-slot 535-*a* on a PRB 530-*a* (e.g., one or more PRBs) of the sub-channel 520-*a*. Likewise, the UE may receive a PSSCH transmission 505-b on a sub-channel 520-b during the slot 515-a. The PSSCH transmission 505-b may be multiplexed with SCI 510-b, which may indicate a time gap 525-b between a last sub-slot of the PSSCH transmission 505-b and a sub-slot 535-a of the slot 515-b in which the UE is scheduled to transmit HARQ feedback for the PSSCH transmission 505-b. Accordingly, the UE may transmit the HARQ feedback for the PSSCH transmission 505-b in the sub-slot 535-b on a PRB 530-b of the sub-channel 520-a.

In some examples, the UE may transmit the HARQ feedback for the PSSCH transmission 505-a and the HARQ feedback for the PSSCH transmission 505-b on a PSFCH 540 of a sidelink resource pool. The PSFCH 540 may be multiplexed (e.g., using FDM) with a PSSCH transmission 505-c, which may provide multiple sub-slot-based HARQ response opportunities for the UE. For example, if the UE receives the PSSCH transmission 505-a (e.g., a shortened PSSCH transmission) in the slot 515-a, the UE may be able to transmit a HARQ response for the PSSCH transmission 505-a in the slot 515-b (e.g., a slot that is directly after the slot 515-a). However, the UE may also be able to transmit a HARQ response for the PSSCH transmission 505-a in later slots as well (e.g., for larger K1 values).

Each of the sub-channels 520 in the slot 515-a may be assigned one or more HARQ resources (e.g., a 1-PRB×1-slot enhanced PSFCH (ePSFCH) resource) for HARQ responses in the slot 515-b. That is, the HARQ resources may occupy a full sidelink slot (e.g., the slot 515-b) rather than a single opportunity in a PSFCH occasion, which may include 2 OFDM symbols. In some examples, the sub-channels 520 can be multiplexed (e.g., using CDM). The PSFCH 540 may be arranged into sub-slots 535, each of which may include a number of symbols.

To assist with automatic gain control (AGC), the UE that received the PSSCH transmissions 505 may transmit a filler waveform from a first symbol of the slot 515-b until the sub-slots 535 indicated by the time gaps 525. In the sub-slots 535, the UE may repeat a PSFCH sequence. Subsequently (e.g., after the sub-slots 535), the UE may continue transmitting the filler waveform until a last symbol of the slot 515-b. Accordingly, a second UE may receive the HARQ response in the corresponding sub-slot 535. For example, a UE that transmitted a PSSCH transmission 505-a in the slot 515-a on sub-channel 520-a may receive the HARQ response in sub-slot 535-a, and a UE that transmitted the PSSCH transmission 505-b in the slot 515-a on sub-channel 520-b may receive the HARQ response in sub-slot 535-b.

The resource mapping scheme 500 may support techniques for improved sidelink feedback reporting between UEs. For example, the described techniques may enable a first UE to transmit HARQ feedback to a second UE using the PSFCH 540. The sidelink resource pool may be configured such that the HARQ feedback can be multiplexed (e.g., using FDM or CDM) with other sidelink transmissions (e.g., PSSCH transmissions 505), which may provide a greater number of opportunities for the first UE to transmit the HARQ feedback. As such, the sidelink resource pool may enable the first UE to transmit the HARQ feedback with reduced latency, among other benefits. In addition, the sidelink resource pool may be configured such that the first UE can transmit multiple repetitions of the HARQ feedback (e.g., in sub-slots 535 or PRBs 530), which may increase the likelihood of the second UE successfully receiving the HARQ feedback.

Figure 6:
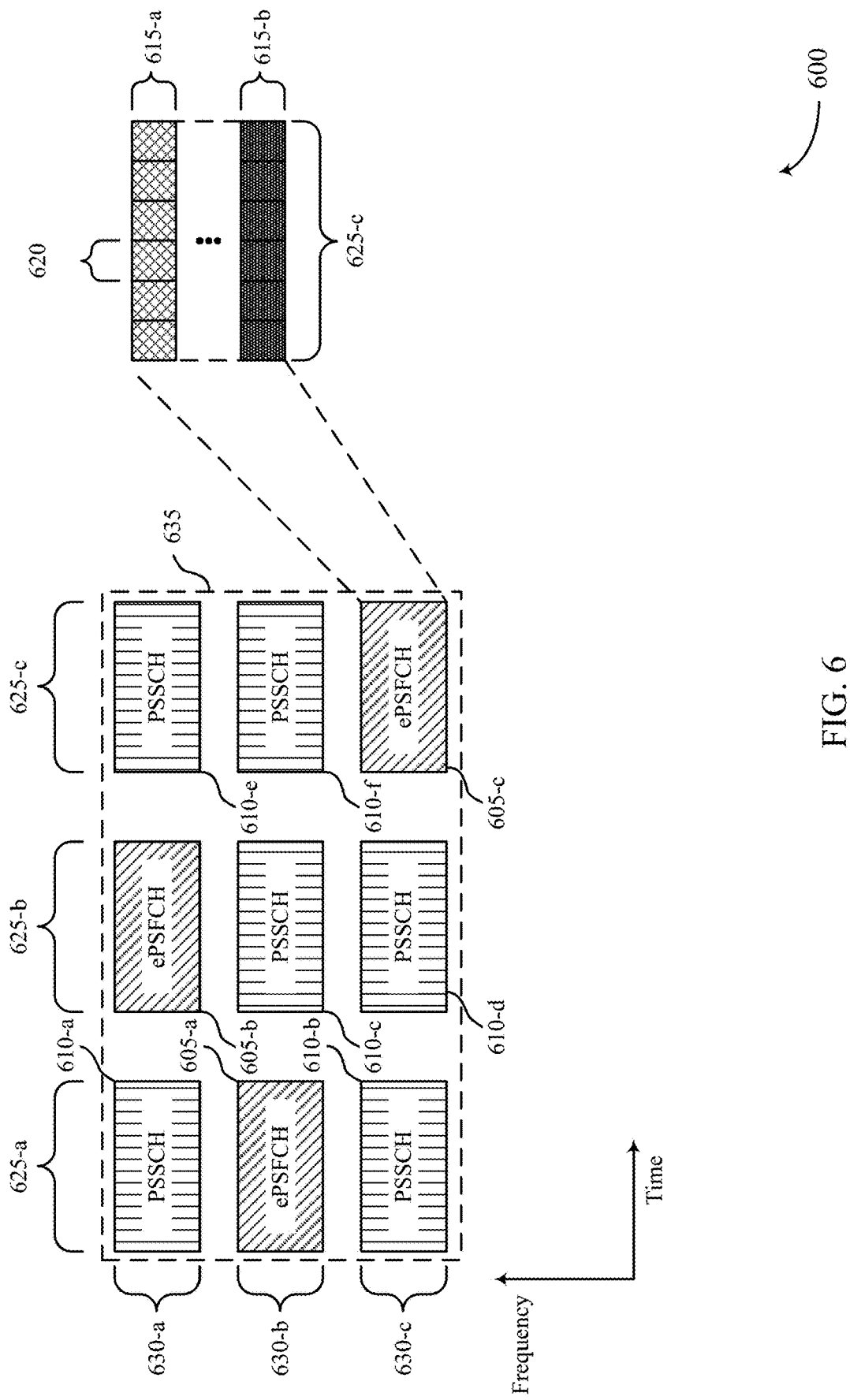

FIG. 6 illustrates an example of a resource mapping scheme 600 that supports techniques for low-latency sidelink feedback transmission in accordance with aspects of the present disclosure. The resource mapping scheme 600 may implement or be implemented by aspects of the wireless communications system 100 and the wireless communications system 200 as described with reference to FIGS. 1 and 2, respectively. For example, the resource mapping scheme 600 may implement or be implemented by a base station or a UE, which may be examples of a base station or a UE as described with reference to FIGS. 1 and 2. The resource mapping scheme 600 may illustrate a sidelink resource pool 635 that includes a number of sub-channels available for sidelink transmission.

The sidelink resource pool 635 may be defined to include multiple sidelink channels and feedback channels, and may support low-latency HARQ responses in accordance with aspects of the present disclosure. The sidelink resource pool 635 may include a PSSCH 610-a, a PSSCH 610-b, a PSSCH 610-c, a PSSCH 610-d, a PSSCH 610-e, a PSSCH 610-f, an ePSFCH 605-a, an ePSFCH 605-b, and an ePSFCH 605-c. In some examples, channels in the sidelink resource pool 635 may be multiplexed in an FDM manner. That is, some channels in the sidelink resource pool 635 may occupy the same time resources (e.g., slots 625). For example, the PSSCH 610-e, the PSSCH 610-f, and the ePSFCH 605-c may occupy different frequency resources (e.g., sub-channels 630) in a slot 625-c. Specifically, the PSSCH 610-e may correspond to a sub-channel 630-a, the PSSCH 610-f may correspond to a sub-channel 630-b, and the ePSFCH 605-c may correspond to a sub-channel 630-c. Similarly, the ePSFCH 605-b, the PSSCH 610-c, and the PSSCH 610-d may occupy different frequency resources in a slot 625-b, and the PSSCH 610-a, the ePSFCH 605-a, and the PSSCH 610-b may occupy different frequency resources within a slot 625-a.

In the example of FIG. 6, the ePSFCH 605-c may be configured as an ePSFCH resource pool (e.g., within the sidelink resource pool 635). That is, the ePSFCH 605-c may be sub-divided into 1-PRB×1-slot ePSFCH resources that can be used for HARQ transmission. In some examples, one or more of the PSSCHs 610 may be mapped to a portion of the ePSFCH 605-c. For example, the PSSCH 610-a may be mapped to a PRB 615-a of the ePSFCH 605-a, and a PSSCH 610-c may be mapped to a PRB 615-b of the ePSFCH 605-a. Thus, HARQ feedback for multiple PSSCH transmissions may be transmitted in the ePSFCH 605-c.

As discussed herein, the ePSFCH 605-c may include a number (e.g., M) of 1-PRB×1-slot resources for low-latency HARQ responses. A sidelink UE may be configured with a pre-defined rule for selecting one or more PSFCH resources (e.g., from the ePSFCH resource pool) to transmit a HARQ response for a PSSCH transmission in a previous slot. For example, if the sidelink UE receives the PSSCH 610-d in the slot 625-b, the sidelink UE may be configured to select one or more PSFCH resources (e.g., 1-PRB×1-slot) from the ePSFCH 605-c based on a time gap and a time-frequency location of the PSSCH transmission 610-d.

In some examples, 12 symbols in an m-th (0≤m<M) 1-PRB×1-slot PSFCH resource (e.g., of the ePSFCH 605-c) may be arranged into N∈{2,3,4,6} sub-slots. To assist with AGC, a UE with a scheduled HARQ response at an n-th (0≤n<N) sub-slot 620 of the slot 625-c may transmit a filler waveform with a constant power throughout the slot 625-c. Specifically, the UE may transmit a filler waveform before the n-th sub-slot 620. In the n-th sub-slot 620, the UE may transmit (e.g., repeat) a PSFCH sequence. After the n-th sub-slot 620, the UE may continue transmitting the filler waveform until a last symbol of the slot 625-c. In some examples, the UE may be configured to transmit the scheduled HARQ response on the PRB 615-*a*, the PRB 615-*b*, or both.

The resource mapping scheme 600 may support techniques for improved sidelink feedback reporting between wireless devices. For example, the described techniques may enable a first wireless device to transmit sidelink feedback information to a second wireless device using one or more PSFCH resources (e.g., 1-PRB×1-slot) of an ePSFCH resource pool (e.g., the ePSFCH 605-*c*). The ePSFCH resource pool may be configured such that the sidelink feedback information can be multiplexed (e.g., using FDM or CDM) with other sidelink channels (e.g., PSSCHs 610), which may provide a greater number of opportunities for the first wireless device to transmit the sidelink feedback information. As such, the ePSFCH resource pool may enable the first wireless device to transmit the sidelink feedback information with reduced latency, among other benefits. In addition, the ePSFCH resource pool may be configured such that the first wireless device can transmit multiple repetitions of the sidelink feedback information (e.g., in multiple PRBs 615), which may increase the likelihood of the second wireless device successfully receiving the sidelink feedback information.

Figure 7:
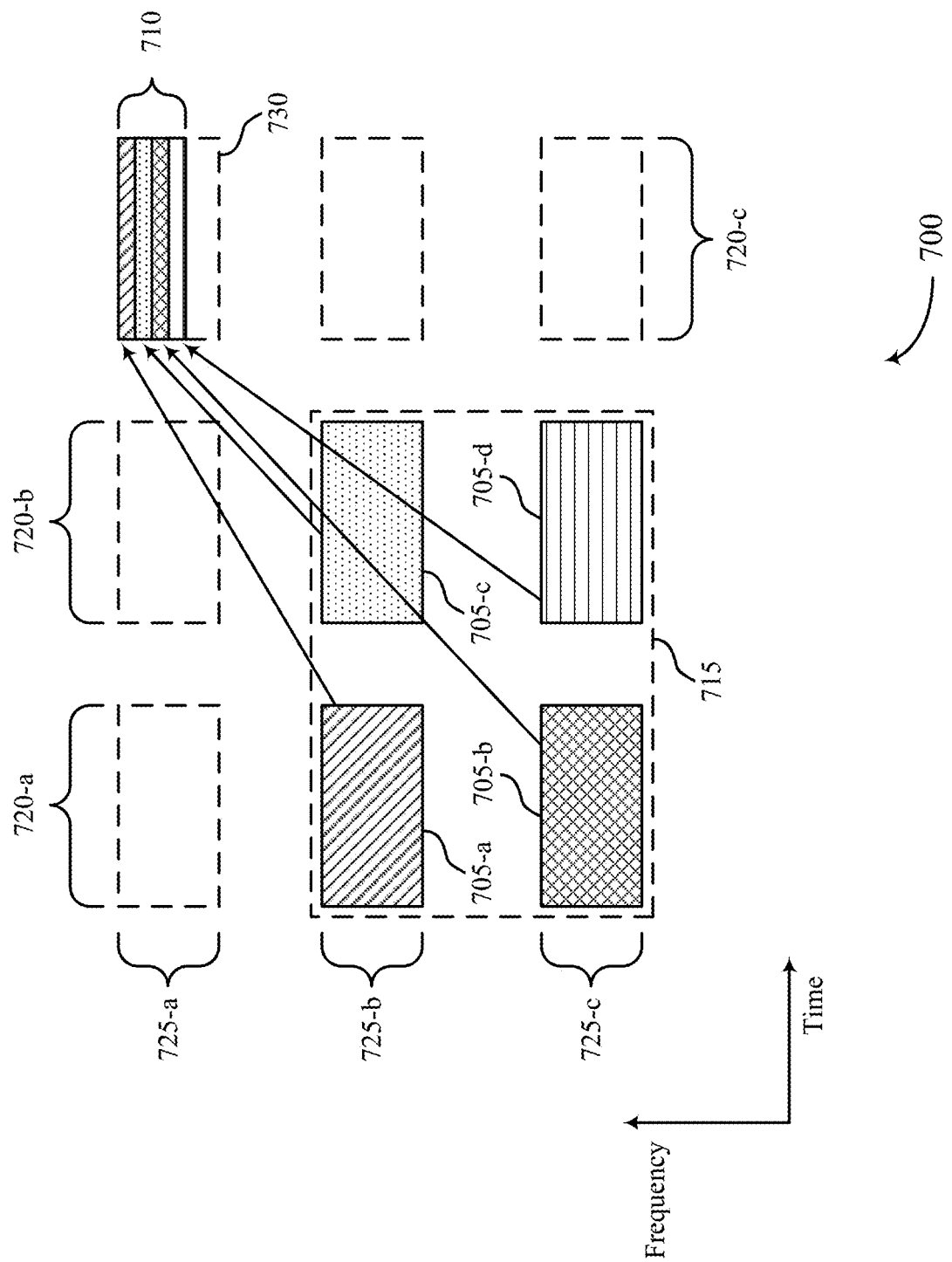

FIG. 7 illustrates an example of a resource mapping scheme 700 that supports techniques for low-latency sidelink feedback transmission in accordance with aspects of the present disclosure. The resource mapping scheme 700 may implement or be implemented by aspects of the wireless communications system 100 and the wireless communications system 200 as described with reference to FIGS. 1 and 2, respectively. For example, the resource mapping scheme 700 may implement or be implemented by a base station or a UE, which may be examples of a base station or a UE as described with reference to FIGS. 1 and 2. The resource mapping scheme 700 may illustrate a mapping between PSSCH transmissions 705 and ePSFCH resources 710 (e.g., 1-PRB×1-slot ePSFCH resources) of a PSFCH 730 (e.g., an ePSFCH resource pool).

In the example of FIG. 7, multiple PSSCH transmissions within a sub-channel window 715 may be mapped to ePSFCH resources 710 of the PSFCH 730 (e.g., a sub-channel of a sidelink resource pool). The PSFCH may occupy a slot 720-*c* and a sub-channel 725-*a*. The sub-channel window 715 may include multiple slots 720 and multiple sub-channels 725. For example, the sub-channel window 715 may include a slot 720-*a*, a slot 720-*b*, a sub-channel 725-*b*, and a sub-channel 725-*c*. As such, the sub-channel window 715 may include a PSSCH transmission 705-*a*, a PSSCH transmission 705-*b*, a PSSCH transmission 705-*c*, and a PSSCH transmission 705-*d*.

In some cases, FDM-based mapping may be used for the ePSFCH resources 710. With FDM-based mapping, different sub-channels 725 within the sub-channel window 715 may be assigned respective 1-PRB×1-slot ePSFCH resources 710 of the PSFCH 730. In some cases, if a UE is configured with a relatively large time gap (e.g., K1) between PSSCH transmission and PSFCH transmission, HARQ responses for PSSCH transmissions 705 in the slot 720-*a* and HARQ responses for PSSCH transmissions 705 in the slot 720-*b* may be scheduled in the slot 720-*c*. That is, the slot 720-*c* (e.g., slot s) may include HARQ responses for PSSCH transmissions 705 transmitted in the slot 720-*b* (e.g., (s-1) slot) and HARQ responses for PSSCH transmissions 705 transmitted in the slot 720-*a* (e.g., (s-2) slot). However, it is to be understood that the slot 720-*c* may also include HARQ responses for PSSCH transmissions 705 transmitted in other slots 720 as well (e.g., (s-3) slot, (s-4) slot). Hence, the sub-channel window 715 may span multiple slots 720.

The resource mapping scheme 700 may support techniques for improved sidelink feedback reporting between wireless devices. For example, the described techniques may enable a first wireless device to transmit HARQ feedback to a second wireless device using the ePSFCH resources 710 of an ePSFCH resource pool (e.g., the PSFCH 730). The ePSFCH resource pool may be configured such that the HARQ feedback can be multiplexed (e.g., using FDM or CDM) with other sidelink transmissions in the slot 720-*c*, which may provide a greater number of opportunities for the first wireless device to transmit the HARQ feedback. As such, the ePSFCH resource pool may enable the first wireless device to transmit the HARQ feedback with reduced latency, among other benefits. In addition, the ePSFCH resource pool may be configured such that the first wireless device can transmit multiple repetitions of the HARQ feedback (e.g., in multiple sub-slots of the slot 720-*c* or multiple PRBs of the sub-channel 725-*a*), which may increase the likelihood of the second wireless device successfully receiving the HARQ feedback from the first wireless device.

Figure 8A:
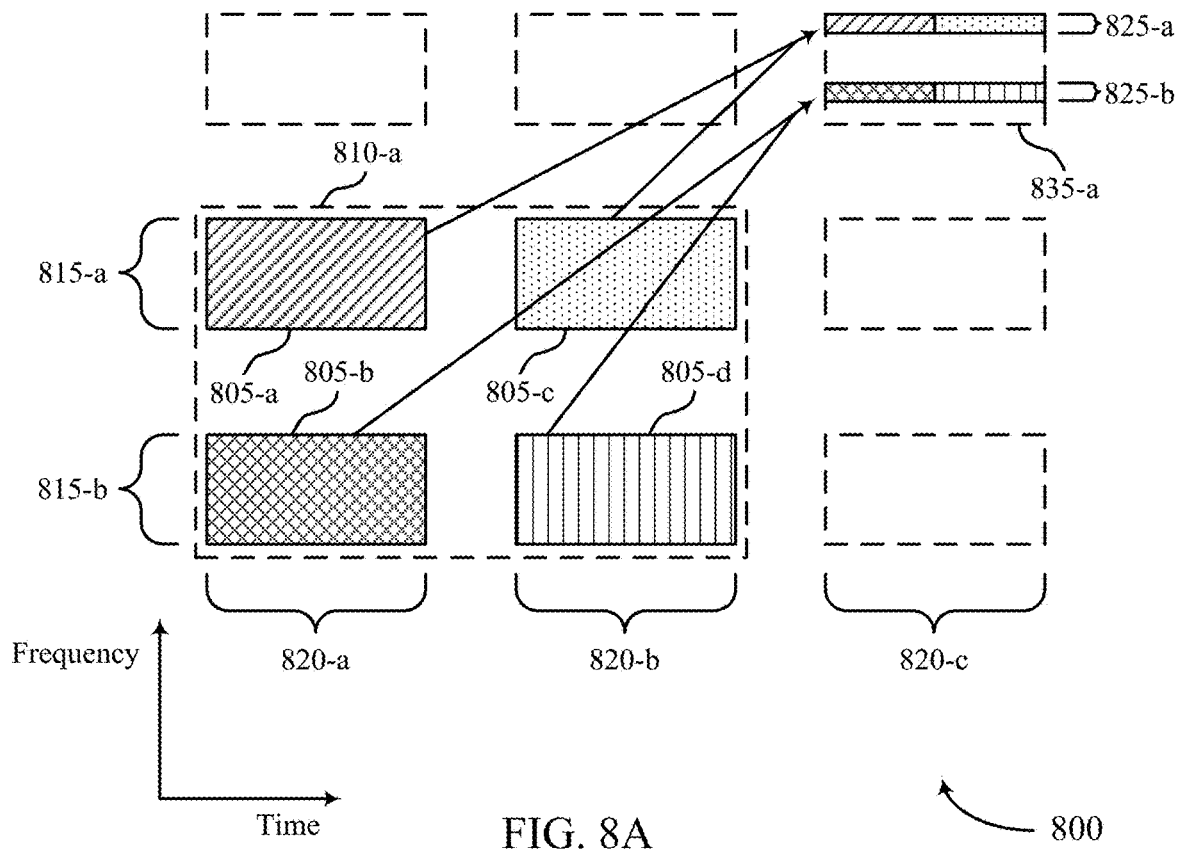
FIGS. 8A and 8B illustrate examples of resource mapping schemes that support techniques for low-latency sidelink feedback transmission in accordance with aspects of the present disclosure.
Figure 8B:
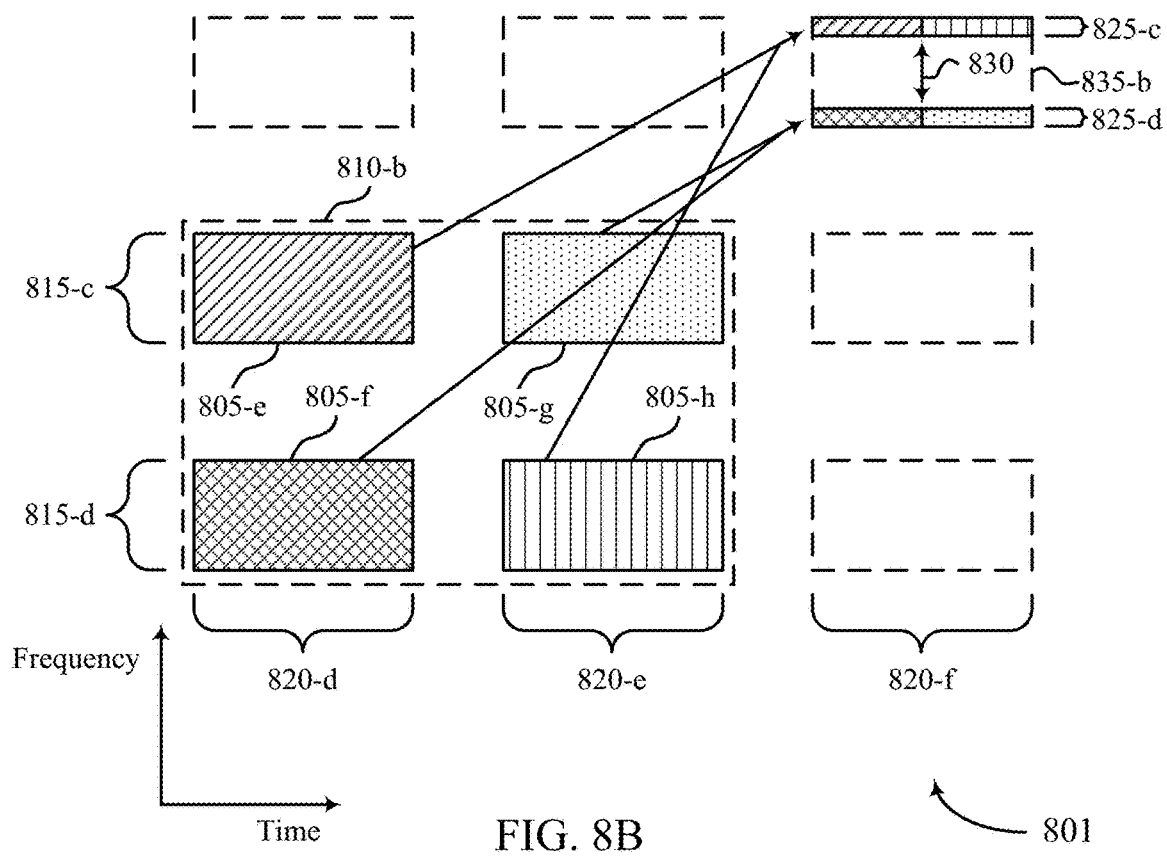

FIGS. 8A and 8B illustrate examples of a resource mapping scheme 800 and a resource mapping scheme 801 that support techniques for low-latency sidelink feedback transmission in accordance with aspects of the present disclosure. The resource mapping scheme 800 and the resource mapping scheme 801 may implement or be implemented by aspects of the wireless communications system 100 and the wireless communications system 200 as described with reference to FIGS. 1 and 2, respectively. For example, the resource mapping scheme 800 and the resource mapping scheme 801 may implement or be implemented by a base station or a UE, which may be examples of a base station or a UE as described with reference to FIGS. 1 and 2. The resource mapping scheme 800 and the resource mapping scheme 801 may illustrate a mapping between PSSCH transmissions 805 and ePSFCH resources 825 (e.g., 1-PRB× 1-slot ePSFCH resources).

In the example of FIG. 8A, CDM may be employed to reduce a number of ePSFCH resources 825 allocated to PSSCH transmissions 805 in a sub-channel window 810-*a*. The sub-channel window 810-*a* may include a sub-channel 815-*a*, a sub-channel 815-*b*, a slot 820-*a*, and a slot 820-*b*. In some examples, a UE may apply a cyclic shift to a computer-generated PSFCH sequence and may transmit the cyclically shifted PSFCH sequence in an ePSFCH resource (e.g., 1-PRB×1-slot) of an ePSFCH resource pool. Thus, multiple sub-channels 815 can be mapped to the same 1-PRB×1-slot ePSFCH resource (e.g., using different cyclic shifts). In some examples, low-bit configuration signaling may reduce the signaling overhead associated with PSFCH reporting.

In the resource mapping scheme 800, PSSCH transmissions 805 in a sub-channel 815-*a* may be mapped to an ePSFCH resource 825-*a* (e.g., 1-PRB×1-slot) of a PSFCH 835-*a* (which may be configured as an ePSFCH resource pool within a larger sidelink resource pool that includes multiple sub-channels), and PSSCH transmissions 805 in a sub-channel 815-*b* may be mapped to an ePSFCH resource 825-*b* of the PSFCH 835-*a*. That is, PSSCH transmissions 805 with the same sub-channel index may be mapped to the same 1-PRB×1-slot resources with different cyclic shifts. For example, HARQ feedback for a PSSCH transmission 805-*a* may be transmitted on the ePSFCH resource 825-*a* with a first cyclic shift, and HARQ feedback for a PSSCH transmission 805-*c* may be transmitted on the ePSFCH resource 825-*a* with a second cyclic shift that is different from the first cyclic shift. Likewise, HARQ feedback for a PSSCH transmission 805-*b* and HARQ feedback for a PSSCH transmission 805-*d* may be transmitted on an ePSFCH resource 825-*b* of the PSFCH 835-*a* with different cyclic shifts.

In the example of FIG. 8B, a sub-channel window 810-*b* may be defined to include a sub-channel 815-*c*, a sub-channel 815-*d*, a slot 820-*d*, and a slot 820-*e*. PSSCH transmissions 805 within the sub-channel window 810-*b* may be mapped to ePSFCH resources 825 of a PSFCH 835-*b* (which may be configured as an ePSFCH resource pool within a slot 820-*f*). That is, a PSSCH transmission 805-*e*, a PSSCH transmission 805-*f*, a PSSCH transmission 805-*g*, and a PSSCH transmission 805-*h* may be mapped to ePSFCH resources 825 of the PSFCH 835-*b*. Each of the ePSFCH resources 825 may include one or more PRBs, one or more sub-slots, or a combination thereof.

In the resource mapping scheme 801, sub-channels 815 with the same slot index may be arranged into a first ePSFCH sub-pool (e.g., of the ePSFCH resource pool) and a second ePSFCH sub-pool may be defined using a frequency offset 830. As a result, the PSSCH transmission 805-*e* and the PSSCH transmission 805-*h* may be assigned to the ePSFCH resource 825-*c* of the PSFCH 835-*b*, whereas the PSSCH transmission 805-*f* and the PSSCH transmission 805-*g* may be assigned to the ePSFCH resource 825-*d* of the PSFCH 835-*b*. That is, HARQ feedback for the PSSCH transmission 805-*e* and the PSSCH transmission 805-*h* may be transmitted on the ePSFCH resource 825-*c* (e.g., on the same or at least partially overlapping time-frequency resources). Likewise, HARQ feedback for the PSSCH transmission 805-*f* and the PSSCH transmission 805-*g* may be transmitted on the ePSFCH resource 825-*d*. Similar to the resource mapping scheme 800, CDM may be employed such that HARQ feedback for the PSSCH transmission 805-*e* can be differentiated from HARQ feedback for the PSSCH transmission 805-*h*, even if communicated partially or fully overlapping within the ePSFCH resource 825-*c*.

The resource mapping scheme 800 and the resource mapping scheme 801 may support techniques for improved sidelink feedback reporting between wireless devices. For example, the described techniques may enable a first wireless device to transmit sidelink feedback information to a second wireless device using one or more ePSFCH resources 825 (e.g., 1-PRB×1-slot ePSFCH resources) of an ePSFCH resource pool (e.g., the PSFCHs 835). The ePSFCH resource pool may be configured such that the sidelink feedback information can be multiplexed (e.g., using FDM or CDM) with other sidelink transmissions (e.g., within a slot 820-*c* or a slot 820-*f*), which may provide a greater number of opportunities for the first wireless device to transmit the sidelink feedback information. As such, the sidelink resource pool may enable the first wireless device to transmit the sidelink feedback information with reduced latency, among other benefits. In addition, the sidelink resource pool may be configured such that the first wireless device can transmit multiple repetitions of the sidelink feedback information (e.g., in multiple sub-slots or PRBs), which may increase the likelihood of the second wireless device successfully receiving the sidelink feedback information from the first wireless device.

Figure 9:
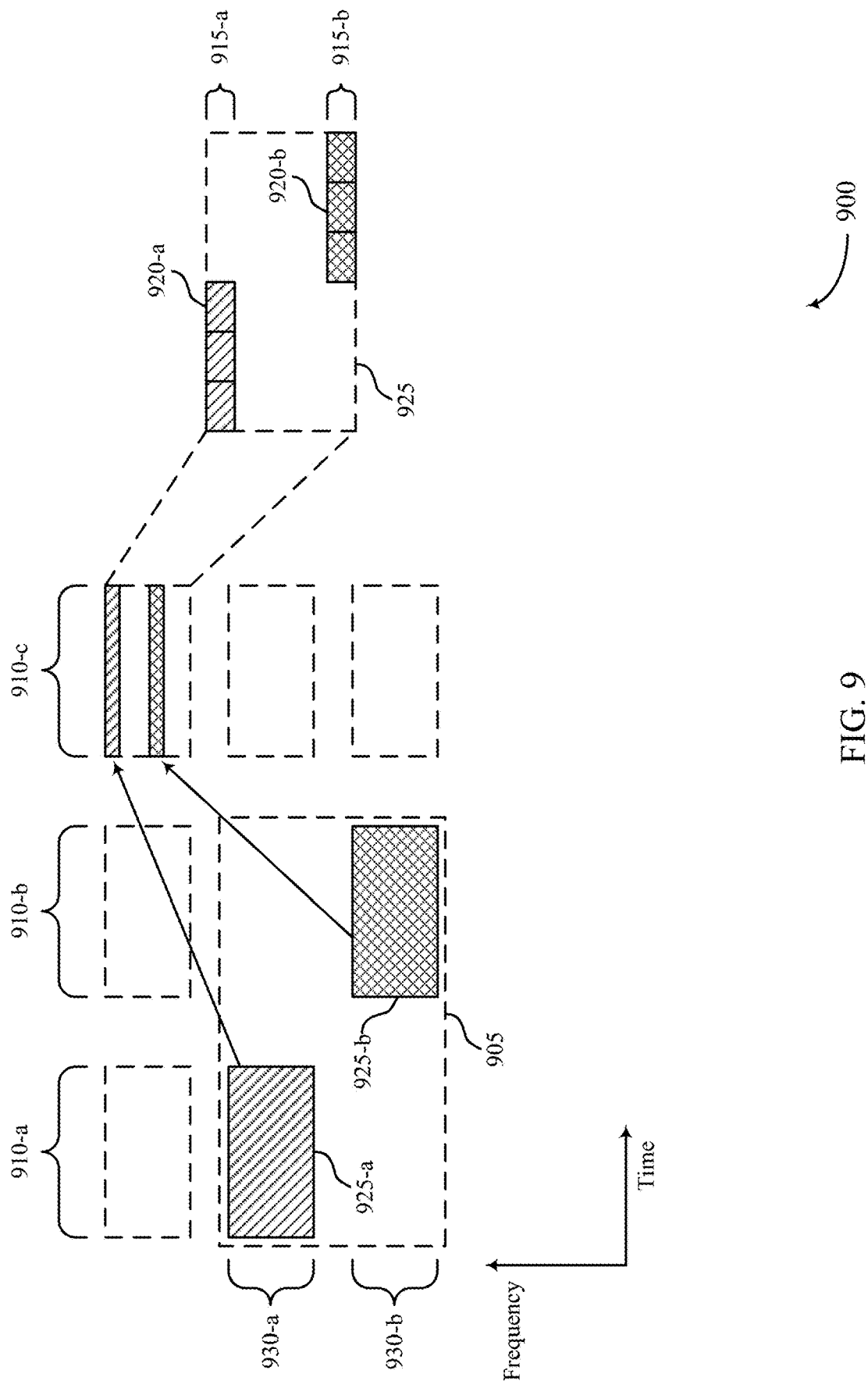
FIG. 9 illustrates an example of a resource mapping scheme that supports techniques for low-latency sidelink feedback transmission in accordance with aspects of the present disclosure.

FIG. 9 illustrates an example of a resource mapping scheme 900 that supports techniques for low-latency sidelink feedback transmission in accordance with aspects of the present disclosure. The resource mapping scheme 900 may implement or be implemented by aspects of the wireless communications system 100 and the wireless communications system 200 as described with reference to FIGS. 1 and 2, respectively. For example, the resource mapping scheme 900 may implement or be implemented by a base station or a UE, which may be examples of a base station or a UE as described with reference to FIGS. 1 and 2. The resource mapping scheme 900 illustrates a mapping between PSSCH transmissions 925 and PRBs 915 of an ePSFCH resource pool 925.

In the example of FIG. 9, a sub-channel window 905 may be defined to include a slot 910-*a*, a slot 910-*b*, a sub-channel 930-*a*, and a sub-channel 930-*b*. Accordingly, PSFCH transmissions (e.g., HARQ feedback) for PSSCH transmissions 925 in the sub-channel window 905 may be mapped to the ePSFCH resource pool 925. When a span of the sub-channel window 905 includes multiple slots 910, a UE may have multiple sub-slot HARQ responses to be transmitted on different PRBs 915 in the ePSFCH resource pool 925. For example, the UE may be scheduled to transmit HARQ responses for a PSSCH transmission 925-*a* and a PSSCH transmission 925-*b* in a slot 910-*c*. In some cases, however, the UE may be unable to transmit on multiple PRBs 915 simultaneously (e.g., due to radio frequency (RF) constraints).

To improve this process, the UE can transmit on a PRB 915-*a* for one or more symbols 920 in a slot 910-*c* and may switch from the PRB 915-*a* to a PRB 915-*b* for remaining symbols 920 in the slot 910-*c* based on times at which each HARQ response is due. For example, if a first HARQ response is due on the PRB 915-*a* at a symbol 920-*a* and a second HARQ response is due on the PRB 915-*b* at a symbol 920-*b*, the UE may switch from the PRB 915-*a* to the PRB 915-*b* after the symbol 920-*a* such that the UE can transmit both HARQ responses.

The resource mapping scheme 900 may support techniques for improved sidelink feedback reporting between wireless devices. For example, the described techniques may enable a first wireless device to transmit sidelink feedback information to a second wireless device using one or more ePSFCH resources of the ePSFCH resource pool 925. The ePSFCH resource pool 925 may be configured such that the sidelink feedback information can be multiplexed (e.g., using FDM or CDM) with other sidelink transmissions (e.g., PSSCH transmissions, PSFCH transmissions), which may provide a greater number of opportunities for the first wireless device to transmit the sidelink feedback information. As such, the ePSFCH resource pool 925 may enable the first wireless device to transmit the sidelink feedback information with reduced latency, among other benefits. In addition, the ePSFCH resource pool 925 may be configured such that the first wireless device can transmit multiple repetitions of the sidelink feedback information (e.g., in multiple symbols 920 or PRBs 915), which may increase the likelihood of the second wireless device successfully receiving the sidelink feedback information.

Figure 10A:
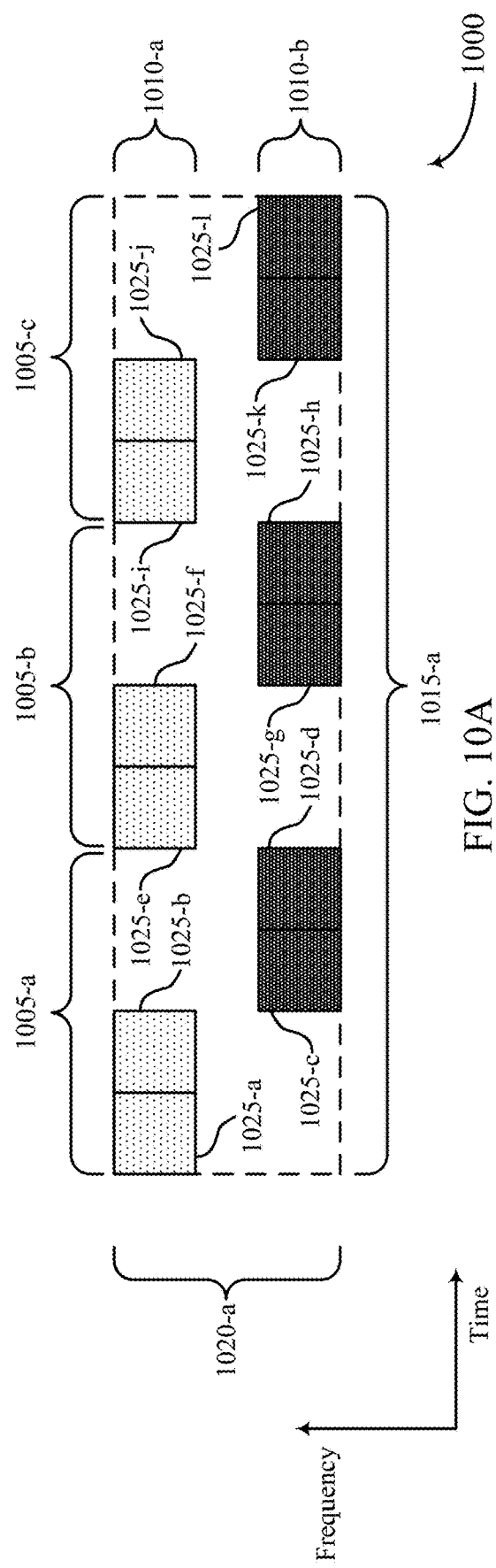
FIGS. 10A and 10B illustrate examples of resource diagrams that support techniques for low-latency sidelink feedback transmission in accordance with aspects of the present disclosure.
Figure 10B:
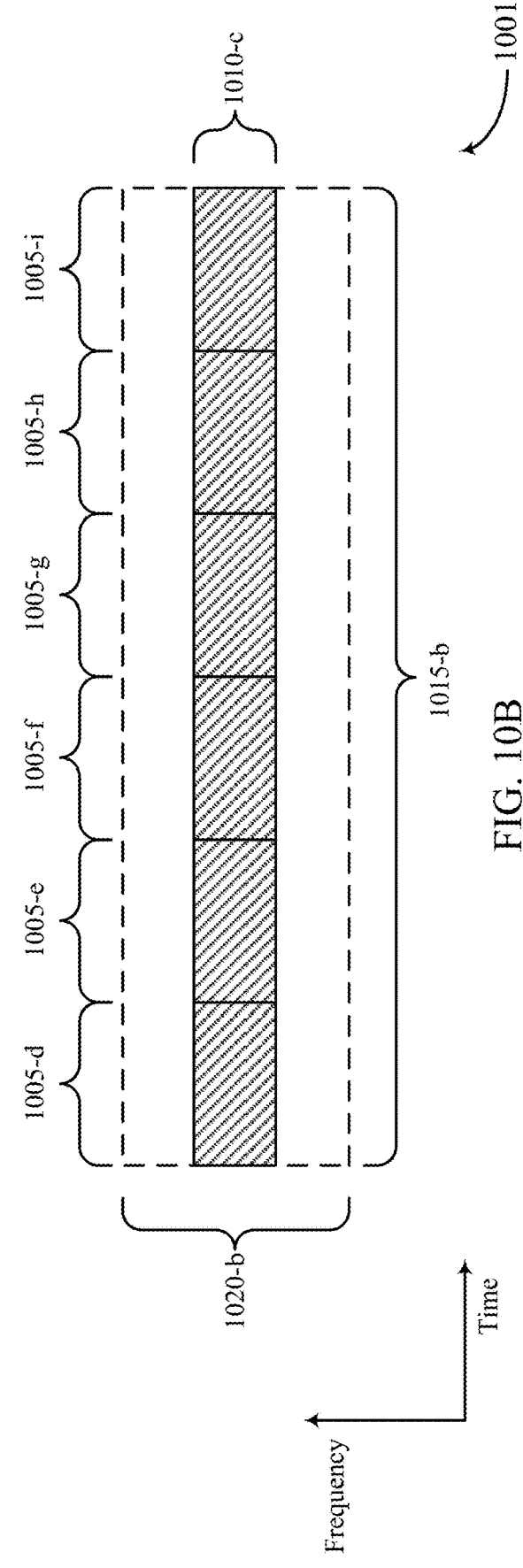

FIGS. 10A and 10B illustrate examples of a resource diagram 1000 and a resource diagram 1001 that support techniques for low-latency sidelink feedback transmission in accordance with aspects of the present disclosure. The resource diagram 1000 and the resource diagram 1001 may implement or be implemented by aspects of the wireless communications system 100 and the wireless communications system 200 as described with reference to FIGS. 1 and 2, respectively. For example, the resource diagram 1000 and the resource diagram 1001 may implement or be implemented by a base station or a UE, which may be examples of a base station or a UE as described with reference to FIGS. 1 and 2. The resource diagram 1000 and the resource diagram 1001 may illustrate different transmission patterns for sidelink feedback information.

To reduce the likelihood of ePSFCH collisions, which may occur when a sub-channel 1020-a is spatially reused by multiple UEs, a UE may be configured to transmit HARQ feedback on multiple PRBs 1010 instead of a single PRB. That is, the UE may be allocated a number of PRBs 1010 (e.g., Z) that is greater than 1 (e.g., Z>1). As such, the UE may transmit HARQ feedback on the number (e.g., Z>1) of PRBs 1010 within an ePSFCH resource pool. For example, the UE may be configured to transmit HARQ feedback on a PRB 1010-a and a PRB 1010-b. Additionally or alternatively, the UE may also transmit the HARQ feedback in multiple sub-slots 1005 of a slot 1015-a. That is, the UE may transmit the HARQ feedback in a sub-slot 1005-a, a sub-slot 1005-b, a sub-slot 1005-c, and a sub-slot 1005-d, each of which may include four symbols 1025.

In some cases, hashing with an L1 source ID can be used for ePSFCH transmission. However, with a single PRB resource allocation, a hashing space may limited by a number of possible cyclic shifts, which may not be sufficient for some examples of spatial multiplexing (e.g., due to sensing errors in Mode 2). In such cases, allocating multiple PRBs 1010 may improve the hashing space. With multiple PRBs 1010 allocated for ePSFCH transmission, intra-sub-slot hopping may be used to provide frequency diversity.

The example of FIG. 10A illustrates an exemplary resource allocation of 2 PRBs 1010 with a sub-slot duration of four symbols 1025. For example, the sub-slot 1005-a may include a symbol 1025-a, a symbol 1025-b, a symbol 1025-c, and a symbol 1025-d (e.g., four symbols 1025). Likewise, the sub-slot 1005-b may include a symbol 1025-e, a symbol 1025-f, a symbol 1025-g, and a symbol 1025-h. Similarly, the sub-slot 1005-c may include a symbol 1025-i, a symbol 1025-j, a symbol 1025-k, and a symbol 1025-l. In some examples, a first symbol and a last symbol of the slot 1015-a may be reserved (e.g., may not be used for HARQ feedback transmission).

In the example of FIG. 10B, a UE may be configured to transmit HARQ feedback for a PSSCH transmission on a PRB 1010-c of a sub-channel 1020-b in or before a sub-slot 1005-f of a slot 1015-b. In some examples, the UE may transmit a filler waveform prior to the sub-slot 1005-f (e.g., for AGC), and may transmit the HARQ feedback during the sub-slot 1005-f. For example, the UE may transmit the filler waveform in a sub-slot 1005-d and a sub-slot 1005-e that precede the sub-slot 1005-f. Additionally or alternatively, the UE may transmit the filler waveform in sub-slots 1005 that are subsequent to the sub-slot 1005-f. That is, the UE may resume transmitting the filler waveform during a sub-slot 1005-g, a sub-slot 1005-h, and a sub-slot 1005-i.

The UE may also be configured to transmit variable-length HARQ response repetitions. That is, the UE may be configured to transmit multiple repetitions of the HARQ feedback in the sub-slots 1005 (e.g., repeat a PSFCH waveform from the nth sub-slot, and in up to each subsequent sub-slot, until the end of the slot). For example, if the UE is scheduled to transmit the HARQ feedback in or before the sub-slot 1005-f, the UE may transmit a first repetition of the HARQ feedback in the sub-slot 1005-f and may transmit one or more additional repetitions of the HARQ feedback in the sub-slot 1005-g, the sub-slot 1005-h, the sub-slot 1005-i, or a combination thereof. Transmitting additional repetitions of the HARQ feedback (e.g., repeating the HARQ feedback) may improve the reliability and coverage of the HARQ feedback. Alternatively, the UE may be configured to apply early termination to the HARQ feedback. That is, the UE may transmit the HARQ feedback in the sub-slot 1005-f and may refrain from transmitting any signals (e.g., HARQ feedback or a filler waveform) in the sub-slot 1005-g, the sub-slot 1005-h, or the sub-slot 1005-i. Applying early termination to the HARQ feedback may result in lower power consumption and reduced signaling overhead at the UE.

The resource diagram 1000 and the resource diagram 1001 may support techniques for improved sidelink feedback reporting between wireless devices. For example, the described techniques may enable a first wireless device to transmit sidelink feedback information to a second wireless device using one or more ePSFCH resources of an ePSFCH resource pool (e.g., within a larger sidelink resource pool). The ePSFCH resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the first wireless device to transmit the sidelink feedback information. As such, the ePSFCH resource pool may enable the first wireless device to transmit the sidelink feedback information with reduced latency, among other benefits. In addition, the ePSFCH resource pool may be configured such that the first wireless device can transmit multiple repetitions of the sidelink feedback information (e.g., in multiple sub-slots 1005 or PRBs 1010), which may increase a coverage level of the sidelink feedback information.

Figure 11:
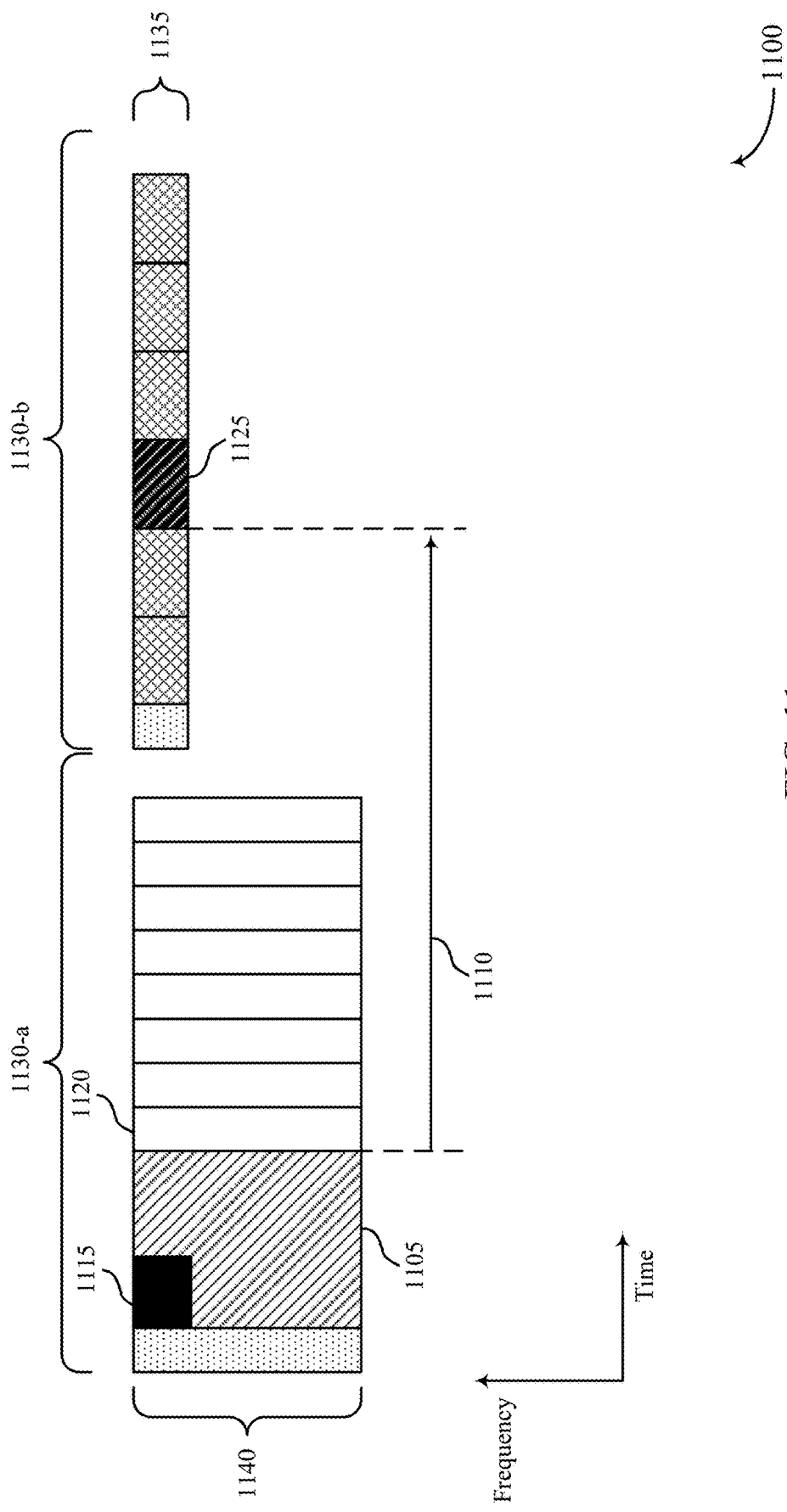
FIG. 11 illustrates an example of a resource mapping scheme that supports techniques for low-latency sidelink feedback transmission in accordance with aspects of the present disclosure.

FIG. 11 illustrates an example of a resource mapping scheme 1100 that supports techniques for low-latency sidelink feedback transmission in accordance with aspects of the present disclosure. The resource mapping scheme 1100 may implement or be implemented by aspects of the wireless communications system 100 and the wireless communications system 200 as described with reference to FIGS. 1 and 2, respectively. For example, the resource mapping scheme 1100 may implement or be implemented by a base station or a UE, which may be examples of a base station or a UE as described with reference to FIGS. 1 and 2. The resource mapping scheme 1100 may illustrate techniques for transmitting sub-slot based HARQ feedback for a PSSCH transmission 1105.

A UE scheduled to receive the PSSCH transmission 1105 (e.g., a low-latency sidelink data message) in a slot 1130-a can be configured to access an ePSFCH resource pool using a time gap 1110. The time gap 1110 (e.g., K1) may be based on a sub-slot (e.g., rather than a slot) in which a last symbol 1120 of the PSSCH transmission 1105 is located. As an example, the UE may transmit HARQ feedback for the PSSCH transmission 1105 in a sub-slot 1125 of a slot 1130-b based on the time gap 1110 and the last symbol 1120 of the PSSCH transmission 1105. In some examples, the UE may transmit the HARQ feedback on a PRB 1135 of a sub-channel 1140 (e.g., a portion of an ePSFCH resource in an ePSFCH resource pool).

The time gap 1110 can be indicated as a layer-three (L3)-configured default value via a system information block (SIB), RRC signaling, or PC5-RRC signaling, among other examples. Additionally or alternatively, the time gap 1110 may be indicated as a dynamic L1 value. For example, the time gap 1110 may be signaled in SCI. In such examples, the time gap 1110 can be from a co-sub-channel SCI 1115 or a previous SCI received in a prior slot (e.g., in the case of cross-slot scheduling). In some examples, a time gap indicated as an L1 dynamic value may override an L3 default value for the time gap.

The resource mapping scheme 1100 may support techniques for improved sidelink feedback reporting between wireless devices. For example, the described techniques may enable a first wireless device to transmit sidelink feedback information to a second wireless device using one or more ePSFCH resources of an ePSFCH resource pool (e.g., within a larger sidelink resource pool, as described with reference to FIG. 6). The ePSFCH resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the first wireless device to transmit the sidelink feedback information. As such, the ePSFCH resource pool may enable the first wireless device to transmit the sidelink feedback information with reduced latency, among other benefits. In addition, the ePSFCH resource pool may be configured such that the first wireless device can transmit multiple repetitions of the sidelink feedback information (e.g., in multiple sub-slots or PRBs), which may increase the likelihood of the second wireless device successfully receiving the sidelink feedback information.

Figure 12A:
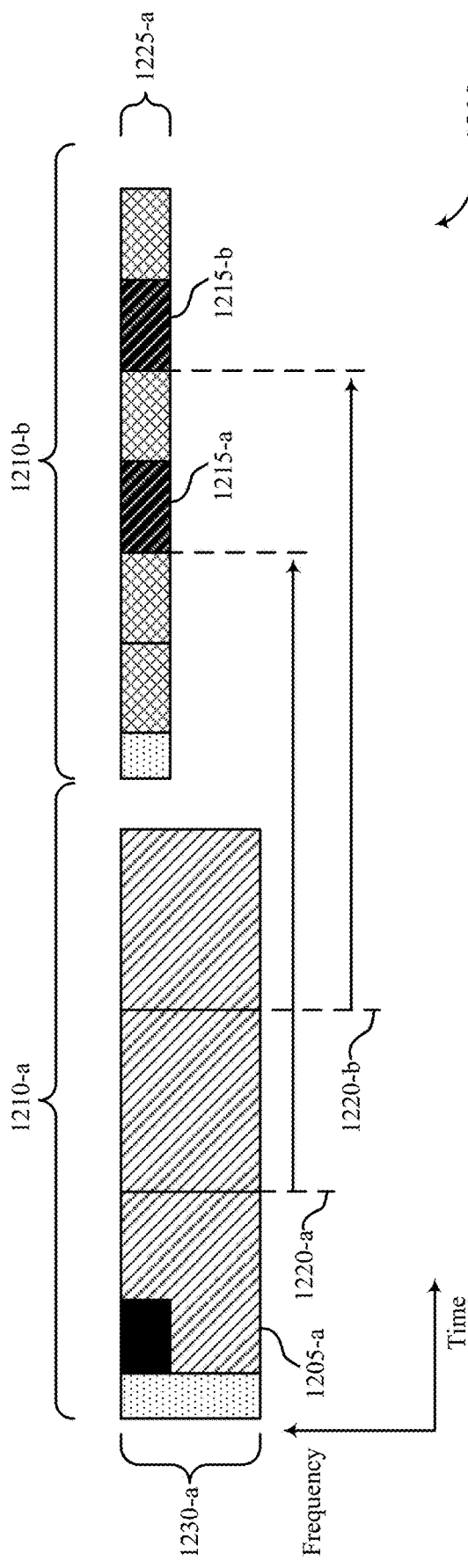
FIGS. 12A and 12B illustrate examples of resource mapping schemes that support techniques for low-latency sidelink feedback transmission in accordance with aspects of the present disclosure.
Figure 12B:
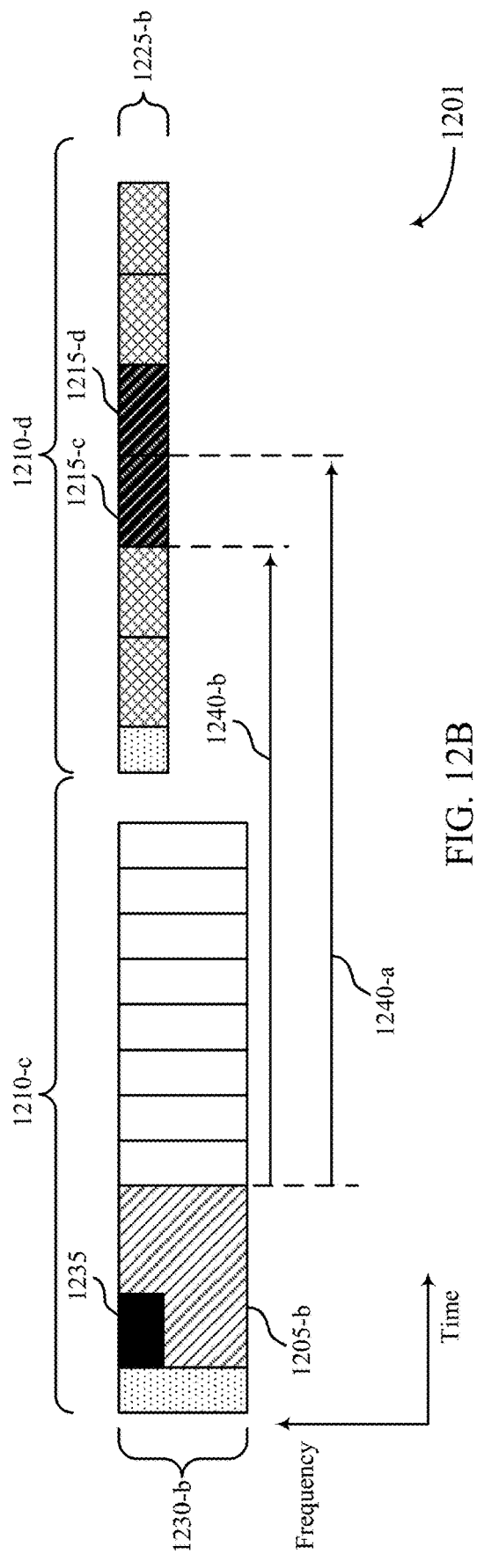

FIGS. 12A and 12B illustrate examples of a resource mapping scheme 1200 and a resource mapping scheme 1201 that support techniques for low-latency sidelink feedback transmission in accordance with aspects of the present disclosure. The resource mapping scheme 1200 and the resource mapping scheme 1201 may implement or be implemented by aspects of the wireless communications system 100 and the wireless communications system 200 as described with reference to FIGS. 1 and 2, respectively. For example, the resource mapping scheme 1200 and the resource mapping scheme 1201 may implement or be implemented by a base station or a UE, which may be examples of a base station or a UE as described with reference to FIGS. 1 and 2. The resource mapping scheme 1200 and the resource mapping scheme 1201 may illustrate techniques for transmitting multiple instances of sidelink feedback information for PSSCH transmissions 1205.

In some examples, multiple sub-slot opportunities of an ePSFCH resource (e.g., a 1-PRB×1-slot ePSFCH resource) can be used to send multiple HARQ responses corresponding to respective early decoding attempts for a PSSCH transmission 1205-a, which may be an example of a low-latency or URLLC PSSCH transmission. In the example of FIG. 12A, the UE may perform two early decoding attempts on the PSSCH transmission 1205-a during a slot 1210-a, and may report corresponding HARQ responses in a sub-slot 1215-a and a sub-slot 1215-b of a slot 1210-b, respectively. Specifically, the UE may perform a first early decoding attempt on the PSSCH transmission 1205-a at 1220-a, and may transmit HARQ feedback pertaining to the first early decoding attempt in the sub-slot 1215-a. The first early decoding attempt may indicate whether decoding of a first portion of the PSSCH transmission 1205-a (e.g., a portion of the PSSCH transmission 1205-a received prior to 1220-a) was successful.

Likewise, the UE may perform a second early decoding attempt on the PSSCH transmission 1205-a at 1220-b, and may transmit HARQ feedback pertaining to the second early decoding attempt in the sub-slot 1215-b. The second early decoding attempt may indicate whether decoding of a second portion of the PSSCH transmission 1205-a (e.g., a portion of the PSSCH transmission 1205-a received prior to 1220-b) was successful. In some examples, the UE may transmit the HARQ feedback on a PRB 1225-a of a sub-channel 1230-a based on a mapping between the PSSCH transmission 1205-a and the PRB 1225-b. In some examples, relay responses for early decoding attempts can be configured with positive acknowledgement (ACK)-only PSFCH resources. That is, the UE may only transmit HARQ feedback for an early decoding attempt on the PSSCH transmission 1205-a if the early decoding attempt is successful.

In the example of FIG. 12B, multiple sub-slot opportunities of an ePSFCH resource pool can be used to send multiple HARQ responses for a PSSCH transmission 1205-b using different time gaps 1240 (e.g., K1 values). For example, a UE may receive co-sub-channel SCI 1235 and cross-scheduling SCI that indicate different time gaps 1240. Specifically, the co-sub-channel SCI 1235 (e.g., piggyback SCI) may indicate a time gap 1240-a and the cross-scheduling SCI may indicate a time gap 1240-b. That is, with piggyback and cross-slot scheduling, a UE can be configured with two time gaps 1240 for a low-latency PSSCH transmission. Accordingly, the UE may transmit a first HARQ response for the PSSCH transmission 1205-b in a sub-slot 1215-c of a slot 1210-d based on the time gap 1240-b, and may transmit a second HARQ response for the PSSCH transmission 1205-b in a sub-slot 1215-d of the slot 1210-d based on the time gap 1240-a. The UE may transmit the first HARQ response and the second HARQ response on a PRB 1225-b of a sub-channel 1230-b in accordance with an ePSFCH resource pool configuration.

In some examples, the UE may be configured with the time gap 1240-b (e.g., a smaller time gap) from the cross-slot scheduling SCI based on performing SCI-independent PSSCH decoding, and may be configured with the time gap 1240-a (e.g., a larger time gap) based on receiving the co-sub-channel SCI 1235 multiplexed with the PSSCH transmission 1205-b in a slot 1210-c. The time gaps 1240 may be based on a capability (e.g., a processing capability) of the UE. In some cases, a timeline for decoding the PSSCH transmission 1205-b may be delayed due to SCI decoding.

The resource mapping scheme 1200 and the resource mapping scheme 1201 may support techniques for improved sidelink feedback reporting between wireless devices. For example, the described techniques may enable a first wireless device to transmit HARQ feedback to a second wireless device using one or more PSFCH resources of an ePSFCH resource pool. The ePSFCH resource pool may be configured such that the HARQ feedback can be multiplexed (e.g., using FDM or CDM) with other sidelink transmissions, which may provide a greater number of opportunities for the first wireless device to transmit the HARQ feedback. As such, the ePSFCH resource pool may enable the first wireless device to transmit the HARQ feedback with reduced latency, among other benefits. In addition, the sidelink resource pool may be configured such that the first wireless device can transmit multiple repetitions of the HARQ feedback (e.g., in multiple sub-slots 1215 or PRBs 1225), which may increase the coverage of the HARQ feedback.

Figure 13:
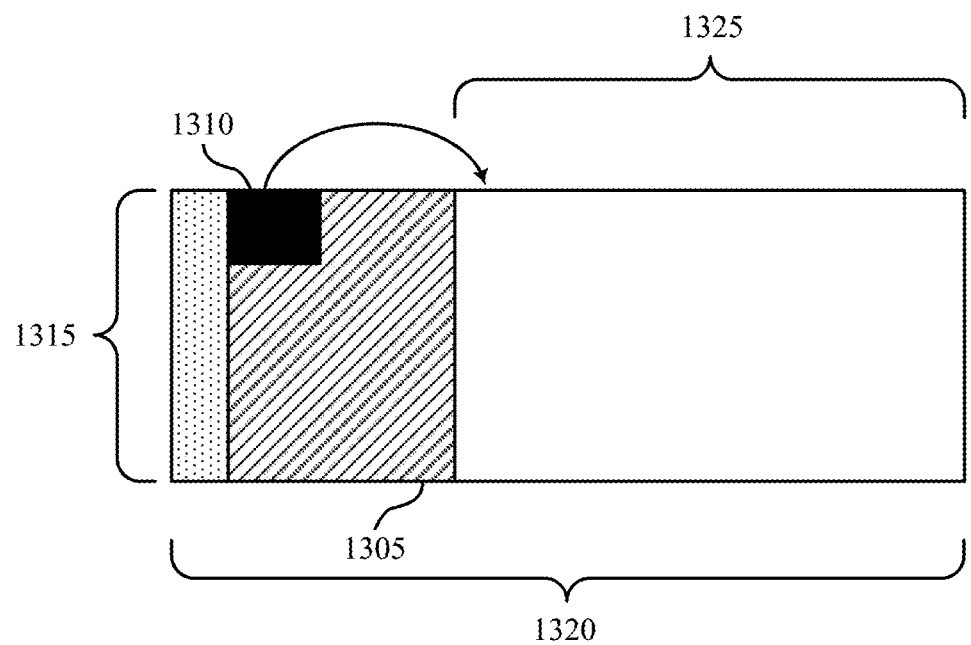
FIG. 13 illustrates an example of a resource diagram that supports techniques for low-latency sidelink feedback transmission in accordance with aspects of the present disclosure.
Figure 13:
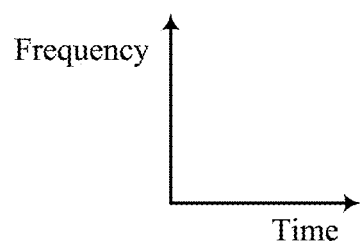

FIG. 13 illustrates an example of a resource diagram 1300 that supports techniques for low-latency sidelink feedback transmission in accordance with aspects of the present disclosure. The resource diagram 1300 may implement or be implemented by aspects of the wireless communications system 100 and the wireless communications system 200 as described with reference to FIGS. 1 and 2, respectively. For example, the resource diagram 1300 may implement or be implemented by a base station or a UE, which may be examples of a base station or a UE as described with reference to FIGS. 1 and 2. The resource diagram 1300 may illustrate techniques for transmitting a shortened PSSCH transmission on a sub-channel 1315 in a slot 1320.

Some sidelink devices may support shortened PSSCH transmissions at a sidelink BWP level. Specifically, L3 may indicate a symbol length (e.g., sl-LengthSymbols-r16) for a PSSCH transmission 1305. In some examples, the symbol length may be a preconfigured value within a symbol range (e.g., {sym7, sym8, sym9, sym10, sym11, sym12, sym13, sym14}). A UE may use the indicated symbol length to guide a physical (PHY) layer in determining demodulation reference signal (DMRS) locations, rate matching information, or transport block (TBS) locations, among other examples. In some cases, dynamically shortened PSSCH transmissions may carry low-latency traffic on the sub-channel 1315 within a sidelink resource pool. A UE can carry an L1 version of the symbol length in SCI 1310 and may prepare to receive the PSSCH transmission 1305 accordingly. The SCI 1310 may be an example of a co-sub-channel scheduling SCI or a cross-slot scheduling SCI, as described with reference to FIGS. 12A and 12B.

To assist with AGC, a transmitting UE can transmit padding bits in remaining symbols 1325 of the slot 1320. After identifying the L1 version of the symbol length (e.g., sl-LengthSymbols-r16), a receiving UE may determine that the shortened PSSCH has ended, and may begin counting for a time gap (e.g., K1) associated with the PSSCH transmission 1305 (e.g., for HARQ feedback transmission). Accordingly, the receiving UE may perform PSSCH decoding and may determine appropriate sub-slots for transmission of HARQ feedback (e.g., based on a time gap). In some examples, if early termination is supported, the transmitting UE may remove padding bits from a dynamically shortened PSSCH transmission after the indicated symbol duration. That is, the transmitting UE may refrain from transmitting any signals (e.g., PSSCH transmissions or padding bits) in the remaining symbols 1325 of the slot 1320. Additionally or alternatively, early termination can be applied to ePSFCH transmissions (e.g., HARQ feedback) for the shortened PSSCH transmission, as described with reference to FIG. 10B.

The resource diagram 1300 may support techniques for improved sidelink feedback reporting between wireless devices. For example, the described techniques may enable a first wireless device to transmit sidelink feedback information to a second wireless device using one or more ePSFCH resources in a sidelink resource pool (e.g., an ePSFCH resource pool of the sidelink resource pool). The sidelink resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the first wireless device to transmit the sidelink feedback information. As such, the sidelink resource pool may enable the first wireless device to transmit the sidelink feedback information with reduced latency, among other benefits. In addition, the sidelink resource pool may be configured such that the first wireless device can transmit multiple repetitions of the sidelink feedback information (e.g., in multiple sub-slots or PRBs), which may increase the likelihood of the second wireless device successfully receiving the sidelink feedback information.

Figure 14:
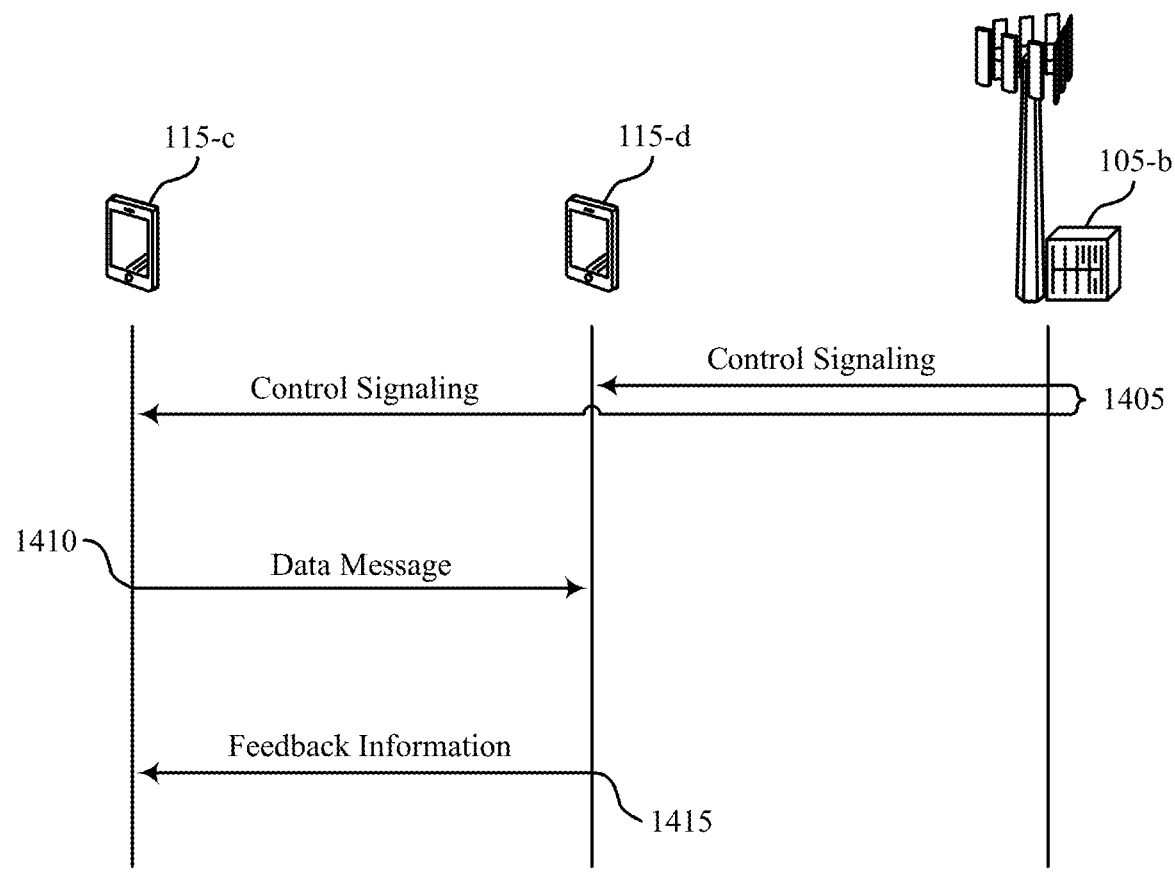
FIG. 14 illustrates an example of a process flow that supports techniques for low-latency sidelink feedback transmission in accordance with aspects of the present disclosure.

FIG. 14 illustrates an example of a process flow 1400 that supports techniques for low-latency sidelink feedback transmission in accordance with aspects of the present disclosure. The process flow 1400 may implement or be implemented by aspects of the wireless communications system 100 and the wireless communications system 200 as described with reference to FIGS. 1 and 2, respectively. For example, the process flow 1400 may implement or be implemented by a base station 105-b, a UE 115-c, and a UE 115-d, which may be examples of a base station and a UE as described with reference to FIGS. 1-13. In the following description of the process flow 1400, the operations between the base station 105-b, the UE 115-c, and the UE 115-d may be performed in different orders or at different times. Some operations may also be left out of the process flow 1400, or other operations may be added.

At 1405, the base station 105-b may transmit control signaling to the UE 115-c, the UE 115-d, or both. The control signaling may indicate a sidelink resource pool, a mapping between sidelink channels (e.g., PSSCHs) and feedback channels (e.g., PSFCHs) in the sidelink resource pool, a time gap (e.g., K1) between sidelink transmission (e.g., PSSCH transmission) and feedback transmission (e.g., HARQ feedback), or a combination thereof. The control signaling may include a SIB, RRC signaling, a MAC control element, a DCI, or a combination thereof. In some examples, the UE may receive an indication of the time gap (e.g., K1 value) in a cross-scheduling SCI from the UE 115-c. The time gap may be defined with respect to a sub-slot rather than a slot. In some examples, the time gap may be indicated as a time gap per link or a time gap per PSSCH instance.

At 1410, the UE 115-c may transmit a sidelink data message to the UE 115-d on a first sidelink channel (e.g., a PSSCH). In some examples, the sidelink data message may be multiplexed with a co-sub-channel SCI, as described with reference to FIGS. 12A and 12B. The co-sub-channel SCI may indicate a second time gap between sidelink transmission and feedback transmission. In some examples, the sidelink data message may include an indication of a symbol length (e.g., e.g., sl-LengthSymbols-r16) for the sidelink data message, as described with reference to FIG. 13. If, for example, the sidelink data message is an example of a shortened PSSCH transmission, as described herein, the UE 115-c may transmit the sidelink data message in a subset (e.g., one or more symbols) of a slot and may transmit padding bits in a remainder of the slot. Alternatively, the UE 115-c may enter a discontinuous transmission (DTX) mode and refrain from transmitting padding bits or sidelink data in the remainder of the slot.

At 1415, the UE 115-d may transmit sidelink feedback information for the sidelink data message to the UE 115-c on a first feedback channel (e.g., a PSFCH) corresponding to the first sidelink channel. More specifically, the UE 115-d may use the mapping and the time gap to identify one or more ePSFCH resources (e.g., 1-PRB×1-slot ePSFCH resources) from a ePSFCH resource pool (e.g., a sub-divided feedback channel of the sidelink resource pool) that correspond to the first sidelink channel. Accordingly, the UE 115-d may transmit the sidelink feedback information using the identified one or more ePSFCH resources. In some examples, the identified one or more ePSFCH resources from the ePSFCH resource pool may be multiplexed (e.g., using FDM) with other sub-channels in the sidelink resource pool. Additionally or alternatively, the sidelink feedback information may be multiplexed (e.g., using CDM) with other feedback transmissions. In such examples, the UE 115-d may transmit the sidelink feedback information with a cyclic shift such that the sidelink feedback information can be distinguished from the other feedback transmissions.

In some examples, the UE 115-d may attempt to perform early decoding for the sidelink data message and may transmit an instance of the sidelink feedback information for each early decoding attempt. Additionally or alternatively, if the UE 115-*d* is configured with multiple time gaps (e.g., based on receiving a cross-slot scheduling SCI and a co-sub-channel SCI), the UE 115-*d* may transmit multiple instances of the sidelink feedback information in accordance with the multiple time gaps. In some examples, the UE 115-*d* may transmit the sidelink feedback information using multiple PRBs (e.g., using frequency hopping) to improve the frequency diversity of the sidelink feedback information. Similarly, the UE 115-*d* may transmit the sidelink feedback information in multiple sub-slots to improve the coverage of the sidelink feedback information. In some examples, the UE 115-*d* may transmit a filler waveform before or after the sidelink feedback information to assist with AGC at the UE 115-*c*.

The process flow 1400 may support techniques for improved sidelink feedback reporting between the UE 115-*c* and the UE 115-*d*. For example, the described techniques may enable the UE 115-*d* to transmit sidelink feedback information to the UE 115-*c* using one or more ePSFCH resources (e.g., 1-PRB×1-slot) of an ePSFCH resource pool. The ePSFCH resource pool may be configured such that the sidelink feedback information can be multiplexed (e.g., using FDM or CDM) with other sidelink transmissions (e.g., PSSCH transmissions, PSFCH transmissions), which may provide a greater number of opportunities for the UE 115-*d* to transmit the sidelink feedback information. As such, the ePSFCH resource pool may enable the UE 115-*d* to transmit the sidelink feedback information with reduced latency, among other benefits. In addition, the ePSFCH resource pool may be configured such that the UE 115-*d* can transmit multiple repetitions of the sidelink feedback information (e.g., in multiple sub-slots or PRBs of the ePSFCH resource pool), which may increase the likelihood of the UE 115-*c* successfully receiving the sidelink feedback information.

Figure 15:
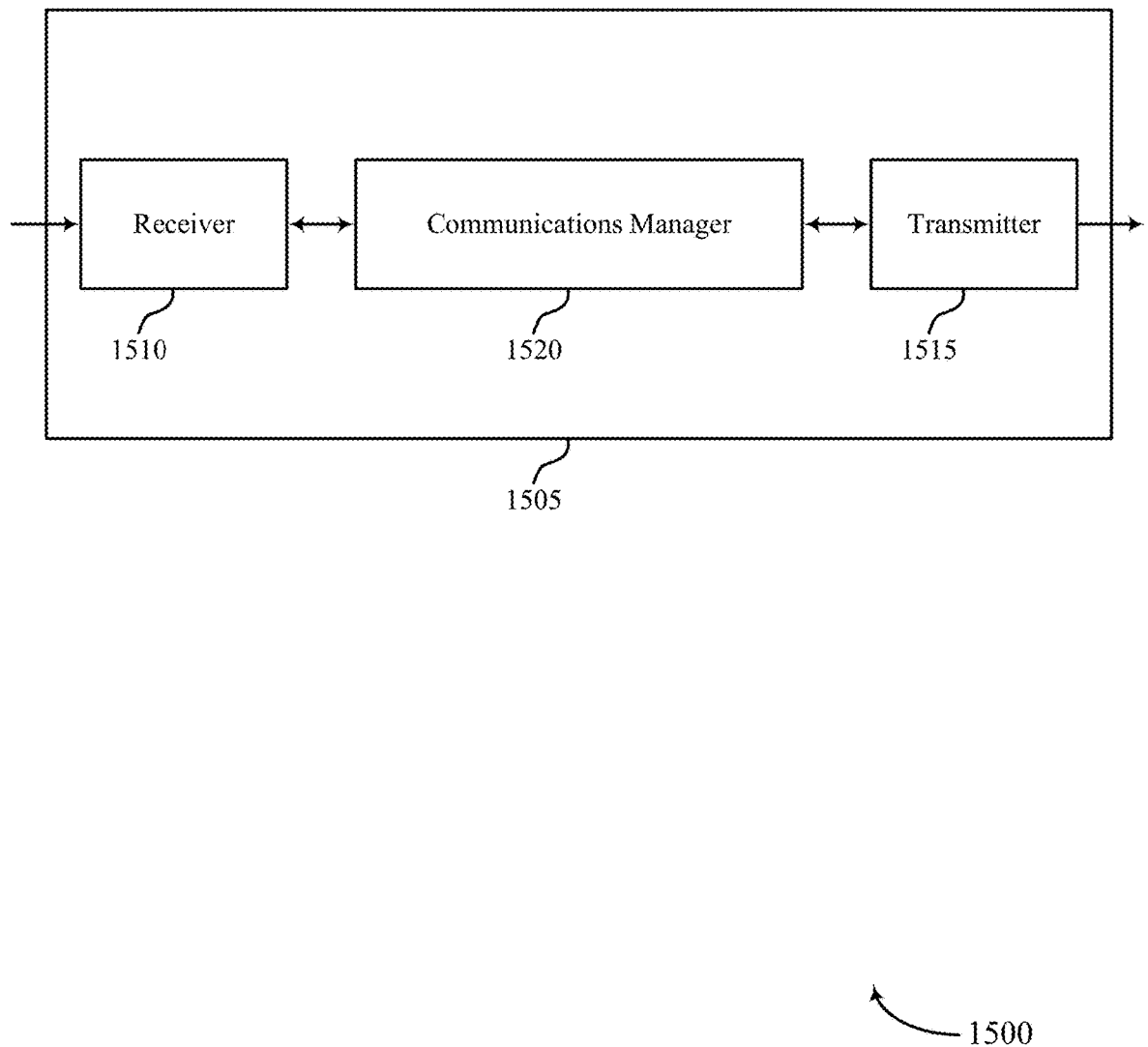
FIGS. 15 and 16 show block diagrams of devices that support techniques for low-latency sidelink feedback transmission in accordance with aspects of the present disclosure.

FIG. 15 shows a block diagram 1500 of a device 1505 that supports techniques for low-latency sidelink feedback transmission in accordance with aspects of the present disclosure. The device 1505 may be an example of aspects of a wireless device (e.g., a UE or a base station) as described herein. The device 1505 may include a receiver 1510, a transmitter 1515, and a communications manager 1520. The device 1505 may also include at least one processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for low-latency sidelink feedback transmission). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for low-latency sidelink feedback transmission). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for low-latency sidelink feedback transmission as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware, software (e.g., executed by at least one processor), or any combination thereof. The hardware may include at least one processor, at least one digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled (e.g., operatively, communicatively, functionally, electronically, or electrically) with the at least one processor may be configured to perform one or more of the functions described herein (e.g., by executing, by the at least one processor, instructions stored in the memory).

Additionally or alternatively, in some examples, the communications manager 1520, the receiver 1510, the transmitter 1515, or various combinations or components thereof may be implemented in hardware, software (e.g., executed by at least one processor), or any combination thereof. If implemented in code executed by at least one processor, the functions of the communications manager 1520, the receiver 1510, the transmitter 1515, or various combinations or components thereof may be performed by at least one general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at the device 1505 in accordance with examples as disclosed herein. For example, the communications manager 1520 may be configured as or otherwise support a means for receiving control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The communications manager 1520 may be configured as or otherwise support a means for receiving a sidelink data message on a first sidelink channel of the set of multiple sidelink channels. The communications manager 1520 may be configured as or otherwise support a means for transmitting, in accordance with the mapping and the time gap, sidelink feedback information for the sidelink data message in the feedback channel sub-slot of the slot on a first feedback channel of the set of multiple feedback channels corresponding to the first sidelink channel.

Additionally or alternatively, the communications manager 1520 may support wireless communications the device 1505 in accordance with examples as disclosed herein. For example, the communications manager 1520 may be configured as or otherwise support a means for communicating control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The communications manager 1520 may be configured as or otherwise support a means for transmitting a sidelink data message on a first sidelink channel of the set of multiple sidelink channels. The communications manager 1520 may be configured as or otherwise support a means for receiving, in accordance with the mapping and the time gap, sidelink feedback information for the sidelink data message in the feedback channel sub-slot of the slot on a first feedback channel of the set of multiple feedback channels corresponding to the first sidelink channel.

By including or configuring the communications manager 1520 in accordance with examples as described herein, the device 1505 (e.g., at least one processor controlling or otherwise coupled (e.g., operatively, communicatively, functionally, electronically, or electrically) to the receiver 1510, the transmitter 1515, the communications manager 1520, or a combination thereof) may support techniques for reduced power consumption based on reducing a number of retransmissions performed by the device 1505. For example, the described techniques may enable the device 1505 to transmit multiple repetitions of sidelink feedback information in a slot, which may increase the likelihood of the sidelink feedback information being successfully received. As a result, the device 1505 may transmit fewer retransmissions of the sidelink feedback information, which may enable the device 1505 to remain in sleep mode for a longer duration.

Figure 16:
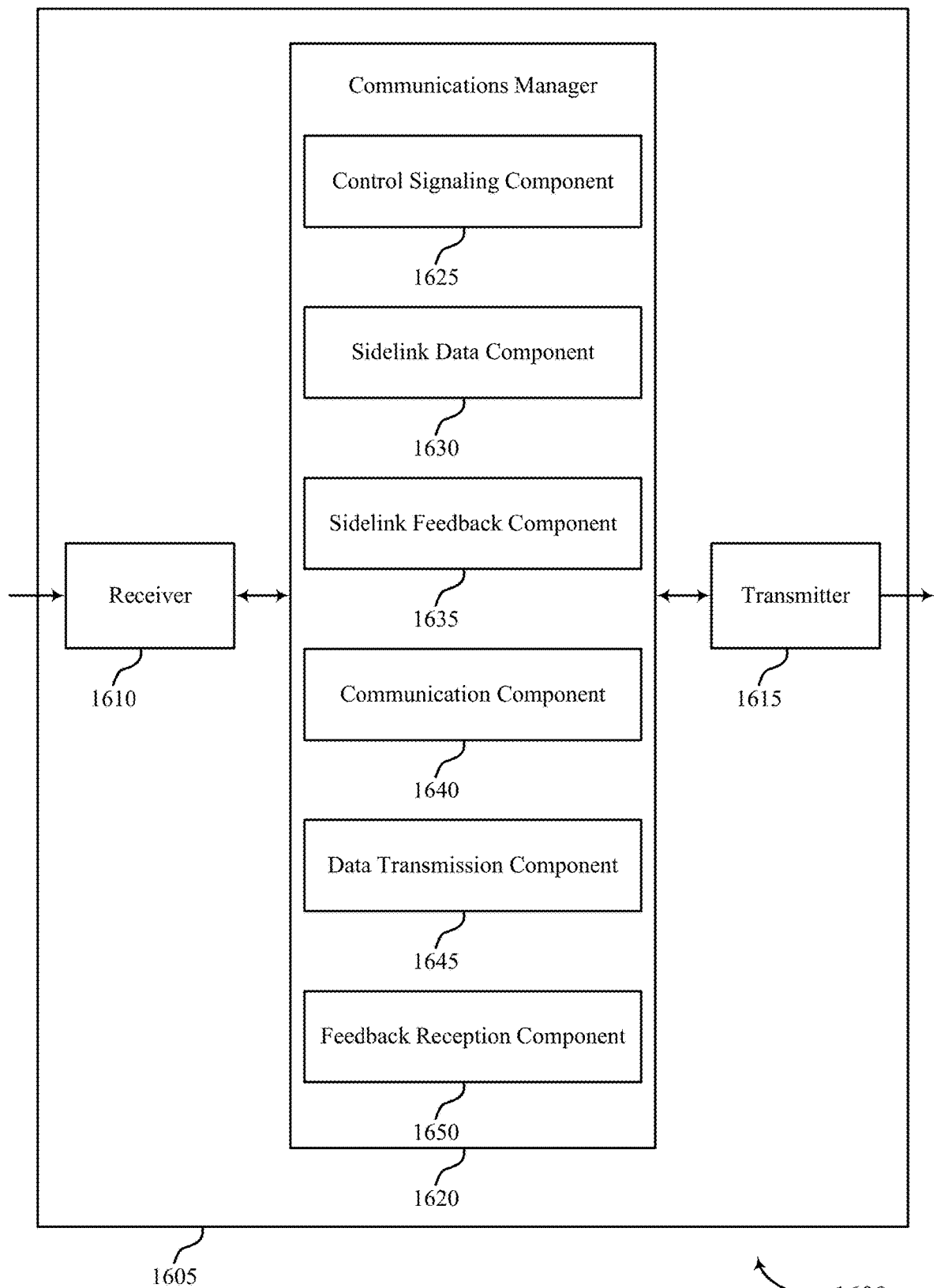

FIG. 16 shows a block diagram 1600 of a device 1605 that supports techniques for low-latency sidelink feedback transmission in accordance with aspects of the present disclosure. The device 1605 may be an example of aspects of a device 1505 or a wireless device (e.g., a UE or a base station) as described herein. The device 1605 may include a receiver 1610, a transmitter 1615, and a communications manager 1620. The device 1605 may also include at least one processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for low-latency sidelink feedback transmission). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for low-latency sidelink feedback transmission). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for low-latency sidelink feedback transmission as described herein. For example, the communications manager 1620 may include a control signaling component 1625, a sidelink data component 1630, a sidelink feedback component 1635, a communication component 1640, a data transmission component 1645, a feedback reception component 1650, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at the device 1605 in accordance with examples as disclosed herein. The control signaling component 1625 may be configured as or otherwise support a means for receiving control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The sidelink data component 1630 may be configured as or otherwise support a means for receiving a sidelink data message on a first sidelink channel of the set of multiple sidelink channels. The sidelink feedback component 1635 may be configured as or otherwise support a means for transmitting, in accordance with the mapping and the time gap, sidelink feedback information for the sidelink data message in the feedback channel sub-slot of the slot on a first feedback channel of the set of multiple feedback channels corresponding to the first sidelink channel.

Additionally or alternatively, the communications manager 1620 may support wireless communications at the device 1605 in accordance with examples as disclosed herein. The communication component 1640 may be configured as or otherwise support a means for communicating control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The data transmission component 1645 may be configured as or otherwise support a means for transmitting a sidelink data message on a first sidelink channel of the set of multiple sidelink channels. The feedback reception component 1650 may be configured as or otherwise support a means for receiving, in accordance with the mapping and the time gap, sidelink feedback information for the sidelink data message in the feedback channel sub-slot of the slot on a first feedback channel of the set of multiple feedback channels corresponding to the first sidelink channel.

Figure 17:
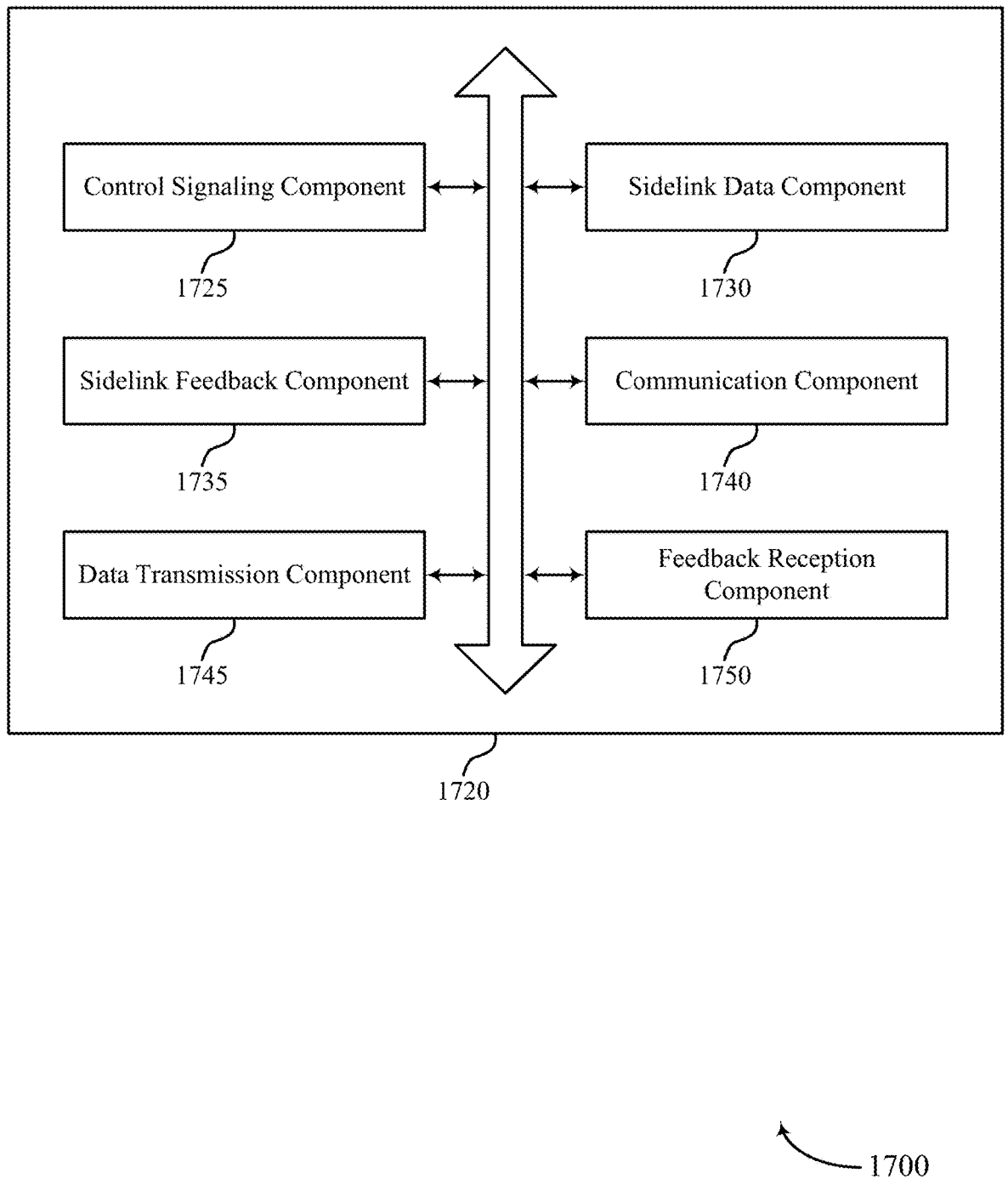
FIG. 17 shows a block diagram of a communications manager that supports techniques for low-latency sidelink feedback transmission in accordance with aspects of the present disclosure.

FIG. 17 shows a block diagram 1700 of a communications manager 1720 that supports techniques for low-latency sidelink feedback transmission in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for low-latency sidelink feedback transmission as described herein. For example, the communications manager 1720 may include a control signaling component 1725, a sidelink data component 1730, a sidelink feedback component 1735, a communication component 1740, a data transmission component 1745, a feedback reception component 1750, or any combination thereof. Each of these components may communicate, directly or indirectly, with one another (e.g., via one or more buses).

The communications manager 1720 may support wireless communications at the device 1705 in accordance with examples as disclosed herein. The control signaling component 1725 may be configured as or otherwise support a means for receiving control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The sidelink data component 1730 may be configured as or otherwise support a means for receiving a sidelink data message on a first sidelink channel of the set of multiple sidelink channels. The sidelink feedback component 1735 may be configured as or otherwise support a means for transmitting, in accordance with the mapping and the time gap, sidelink feedback information for the sidelink data message in the feedback channel sub-slot of the slot on a first feedback channel of the set of multiple feedback channels corresponding to the first sidelink channel. In some examples, at least one sidelink channel of the set of multiple sidelink channels is FDM-ed with at least one feedback channel of the set of multiple feedback channels.

In some examples, to support transmitting the sidelink feedback information, the sidelink feedback component 1735 may be configured as or otherwise support a means for transmitting the sidelink feedback information for the sidelink data message on the first feedback channel and on a second feedback channel of the set of multiple feedback channels corresponding to the first sidelink channel.

In some examples, to support transmitting the sidelink feedback information, the sidelink feedback component 1735 may be configured as or otherwise support a means for transmitting the sidelink feedback information that is a cyclically shifted.

In some examples, to support transmitting the sidelink feedback information, the sidelink feedback component 1735 may be configured as or otherwise support a means for transmitting, on the first feedback channel, the sidelink feedback information that is CDM-ed with second sidelink feedback information for a second sidelink data message.

In some examples, to support receiving the sidelink data message, the sidelink data component 1730 may be configured as or otherwise support a means for receiving SCI that is multiplexed with the sidelink data message, where the SCI includes an indication of a second time gap between sidelink channel transmission and feedback transmission with respect to a second feedback channel sub-slot of the set of multiple feedback channel sub-slots.

In some examples, to support transmitting the sidelink feedback information, the sidelink feedback component 1735 may be configured as or otherwise support a means for transmitting, in accordance with the time gap, a first repetition of the sidelink feedback information on the first feedback channel in the feedback channel sub-slot. In some examples, to support transmitting the sidelink feedback information, the sidelink feedback component 1735 may be configured as or otherwise support a means for transmitting, in accordance with the second time gap, a second repetition of the sidelink feedback information on the first feedback channel in the second feedback channel sub-slot.

In some examples, to support transmitting the sidelink feedback information, the sidelink feedback component 1735 may be configured as or otherwise support a means for transmitting first sidelink feedback information for a first portion of the sidelink data message on the first feedback channel in the feedback channel sub-slot based on a first attempt to perform early decoding of the sidelink data message. In some examples, to support transmitting the sidelink feedback information, the sidelink feedback component 1735 may be configured as or otherwise support a means for transmitting second sidelink feedback information for a second portion of the sidelink data message on the first feedback channel in a second feedback channel sub-slot of the set of multiple feedback channel sub-slots based on a second attempt to perform early decoding of the sidelink data message.

In some examples, to support receiving the sidelink data message, the sidelink data component 1730 may be configured as or otherwise support a means for receiving an indication of a symbol length for the sidelink data message, where the sidelink data message is received based on the symbol length.

In some examples, to support transmitting the sidelink feedback information, the sidelink feedback component 1735 may be configured as or otherwise support a means for transmitting a filler waveform on the first feedback channel in a first set of one or more feedback channel sub-slots of the set of multiple feedback channel sub-slots. In some examples, to support transmitting the sidelink feedback information, the sidelink feedback component 1735 may be configured as or otherwise support a means for transmitting one or more instances of the sidelink feedback information on the first feedback channel in a second set of one or more feedback channel sub-slots of the set of multiple feedback channel sub-slots.

In some examples, the sidelink data component 1730 may be configured as or otherwise support a means for receiving a second sidelink data message on a second sidelink channel of the set of multiple sidelink channels. In some examples, the sidelink feedback component 1735 may be configured as or otherwise support a means for transmitting the sidelink feedback information for the sidelink data message on the first feedback channel in a first set of one or more feedback channel sub-slots of the set of multiple feedback channel sub-slots. In some examples, the sidelink feedback component 1735 may be configured as or otherwise support a means for transmitting second sidelink feedback information for the second sidelink data message on a second feedback channel of the set of multiple feedback channels corresponding to the second sidelink channel in a second set of one or more feedback channel sub-slots of the set of multiple feedback channel sub-slots.

In some examples, to support transmitting the sidelink feedback information, the sidelink feedback component 1735 may be configured as or otherwise support a means for transmitting a set of multiple repetitions of the sidelink feedback information on the first feedback channel in two or more of the set of multiple feedback channel sub-slots, where each feedback channel sub-slot of the set of multiple feedback channel sub-slots includes one or more symbol periods. In some examples, each feedback channel of the set of multiple feedback channels includes at least a PRB within a feedback resource pool.

In some examples, to support receiving the control signaling, the control signaling component 1725 may be configured as or otherwise support a means for receiving, from a second wireless device, control signaling indicating a time gap for each communication link of a set of multiple communication links between the device 1705 and the second wireless device, a time gap for each PSSCH instance of a set of multiple PSSCH instances, or a combination thereof. In some examples, the control signaling includes a SIB, RRC signaling, SCI, a MAC control element, or a combination thereof.

Additionally or alternatively, the communications manager 1720 may support wireless communications at the device 1705 in accordance with examples as disclosed herein. The communication component 1740 may be configured as or otherwise support a means for communicating control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The data transmission component 1745 may be configured as or otherwise support a means for transmitting a sidelink data message on a first sidelink channel of the set of multiple sidelink channels. The feedback reception component 1750 may be configured as or otherwise support a means for receiving, in accordance with the mapping and the time gap, sidelink feedback information for the sidelink data message in the feedback channel sub-slot of the slot on a first feedback channel of the set of multiple feedback channels corresponding to the first sidelink channel.

In some examples, to support communicating the control signaling, the communication component 1740 may be configured as or otherwise support a means for transmitting, to a second wireless device, the control signaling indicating the mapping and the time gap.

In some examples, to support communicating the control signaling, the communication component 1740 may be configured as or otherwise support a means for receiving, from a second wireless device, the control signaling indicating the mapping and the time gap. In some examples, the control signaling includes a SIB, RRC signaling, SCI, a MAC control element, or a combination thereof.

In some examples, to support receiving the sidelink feedback information, the feedback reception component 1750 may be configured as or otherwise support a means for receiving, on the first feedback channel, the sidelink feedback information that is CDM-ed with second sidelink feedback information for a second sidelink data message.

In some examples, to support transmitting the sidelink data message, the data transmission component 1745 may be configured as or otherwise support a means for transmitting SCI that is multiplexed with the sidelink data message, where the SCI includes an indication of a second time gap between sidelink channel transmission and feedback transmission with respect to a second feedback channel sub-slot of the set of multiple feedback channel sub-slots.

In some examples, to support receiving the sidelink feedback information, the feedback reception component 1750 may be configured as or otherwise support a means for receiving, in accordance with the time gap, a first repetition of the sidelink feedback information on the first feedback channel in the feedback channel sub-slot. In some examples, to support receiving the sidelink feedback information, the feedback reception component 1750 may be configured as or otherwise support a means for receiving, in accordance with the second time gap, a second repetition of the sidelink feedback information on the first feedback channel in the second feedback channel sub-slot.

In some examples, to support receiving the sidelink feedback information, the feedback reception component 1750 may be configured as or otherwise support a means for receiving a filler waveform on the first feedback channel in a first set of one or more feedback channel sub-slots of the set of multiple feedback channel sub-slots. In some examples, to support receiving the sidelink feedback information, the feedback reception component 1750 may be configured as or otherwise support a means for receiving one or more instances of the sidelink feedback information on the first feedback channel in a second set of one or more feedback channel sub-slots of the set of multiple feedback channel sub-slots.

In some examples, to support receiving the sidelink feedback information, the feedback reception component 1750 may be configured as or otherwise support a means for receiving the sidelink feedback information on the first feedback channel and on a second feedback channel of the set of multiple feedback channels corresponding to the first sidelink channel. In some examples, at least one sidelink channel of the set of multiple sidelink channels is FDM-ed with at least one feedback channel of the set of multiple feedback channels.

In some examples, to support receiving the sidelink feedback information, the feedback reception component 1750 may be configured as or otherwise support a means for receiving a set of multiple repetitions of the sidelink feedback information on the first feedback channel in the set of multiple feedback channel sub-slots, where each feedback channel sub-slot of the set of multiple feedback channel sub-slots includes one or more symbol periods.

In some examples, to support transmitting the sidelink data message, the data transmission component 1745 may be configured as or otherwise support a means for transmitting the sidelink data message on the first sidelink channel in a first set of one or more sidelink channel sub-slots within a second slot, where the sidelink data message includes an indication of a symbol length for the sidelink data message. In some examples, to support transmitting the sidelink data message, the data transmission component 1745 may be configured as or otherwise support a means for transmitting one or more padding bits on the first sidelink channel in a second set of one or more sidelink channel sub-slots within the second slot.

Figure 18:
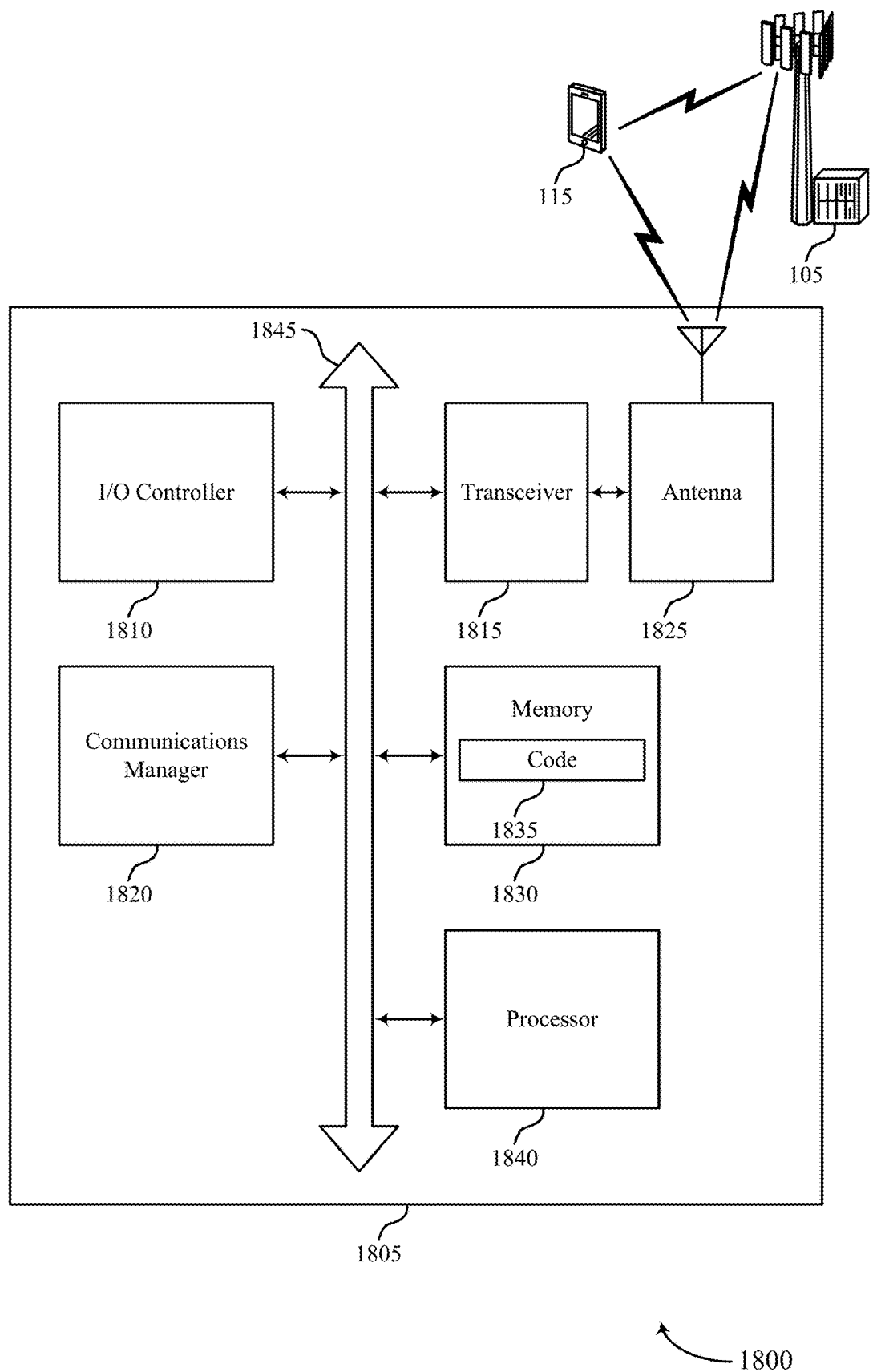
FIG. 18 shows a diagram of a system including a device that supports techniques for low-latency sidelink feedback transmission in accordance with aspects of the present disclosure.

FIG. 18 shows a diagram of a system 1800 including a device 1805 that supports techniques for low-latency sidelink feedback transmission in accordance with aspects of the present disclosure. The device 1805 may be an example of or include the components of a device 1505, a device 1605, or a wireless device (e.g., a UE or a base station) as described herein. The device 1805 may include components for bi-directional voice and data communications including components for transmitting and receiving communications, such as a communications manager 1820, an I/O controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include random-access memory (RAM) and read-only memory (ROM). The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a basic I/O system (BIOS) which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for low-latency sidelink feedback transmission). For example, the device 1805 or a component of the device 1805 may include a processor 1840 and memory 1830 coupled (e.g., operatively, communicatively, functionally, electronically, or electrically) to the processor 1840, the processor 1840 and memory 1830 configured to perform various functions described herein.

The communications manager 1820 may support wireless communications at the device 1805 in accordance with examples as disclosed herein. For example, the communications manager 1820 may be configured as or otherwise support a means for receiving control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The communications manager 1820 may be configured as or otherwise support a means for receiving a sidelink data message on a first sidelink channel of the set of multiple sidelink channels. The communications manager 1820 may be configured as or otherwise support a means for transmitting, in accordance with the mapping and the time gap, sidelink feedback information for the sidelink data message in the feedback channel sub-slot of the slot on a first feedback channel of the set of multiple feedback channels corresponding to the first sidelink channel.

Additionally or alternatively, the communications manager 1820 may support wireless communications at the device 1805 in accordance with examples as disclosed herein. For example, the communications manager 1820 may be configured as or otherwise support a means for communicating control signaling indicating a set of multiple sidelink channels of a sidelink resource pool, a mapping between each sidelink channel of the set of multiple sidelink channels to a corresponding feedback channel of a set of multiple feedback channels, and a time gap between sidelink channel transmission and feedback transmission with respect to a feedback channel sub-slot of a set of multiple feedback channel sub-slots within a slot. The communications manager 1820 may be configured as or otherwise support a means for transmitting a sidelink data message on a first sidelink channel of the set of multiple sidelink channels. The communications manager 1820 may be configured as or otherwise support a means for receiving, in accordance with the mapping and the time gap, sidelink feedback information for the sidelink data message in the feedback channel sub-slot of the slot on a first feedback channel of the set of multiple feedback channels corresponding to the first sidelink channel.

By including or configuring the communications manager 1820 in accordance with examples as described herein, the device 1805 may support techniques for reduced latency and improved communication reliability based on using a sidelink resource pool to transmit sidelink feedback information. For example, the described techniques may enable the device 1805 to multiplex the sidelink feedback information with other sidelink transmissions, which may provide a greater number of opportunities for the device 1805 to transmit the sidelink feedback information. The described techniques may also enable the device 1805 to transmit multiple repetitions of the sidelink feedback information (e.g., in multiple sub-slots or PRBs), which may increase the likelihood that the sidelink feedback information is successfully received.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for low-latency sidelink feedback transmission as described herein, or the processor 1840 and the memory 1830 may be otherwise configured to perform or support such operations.

Figure 19:
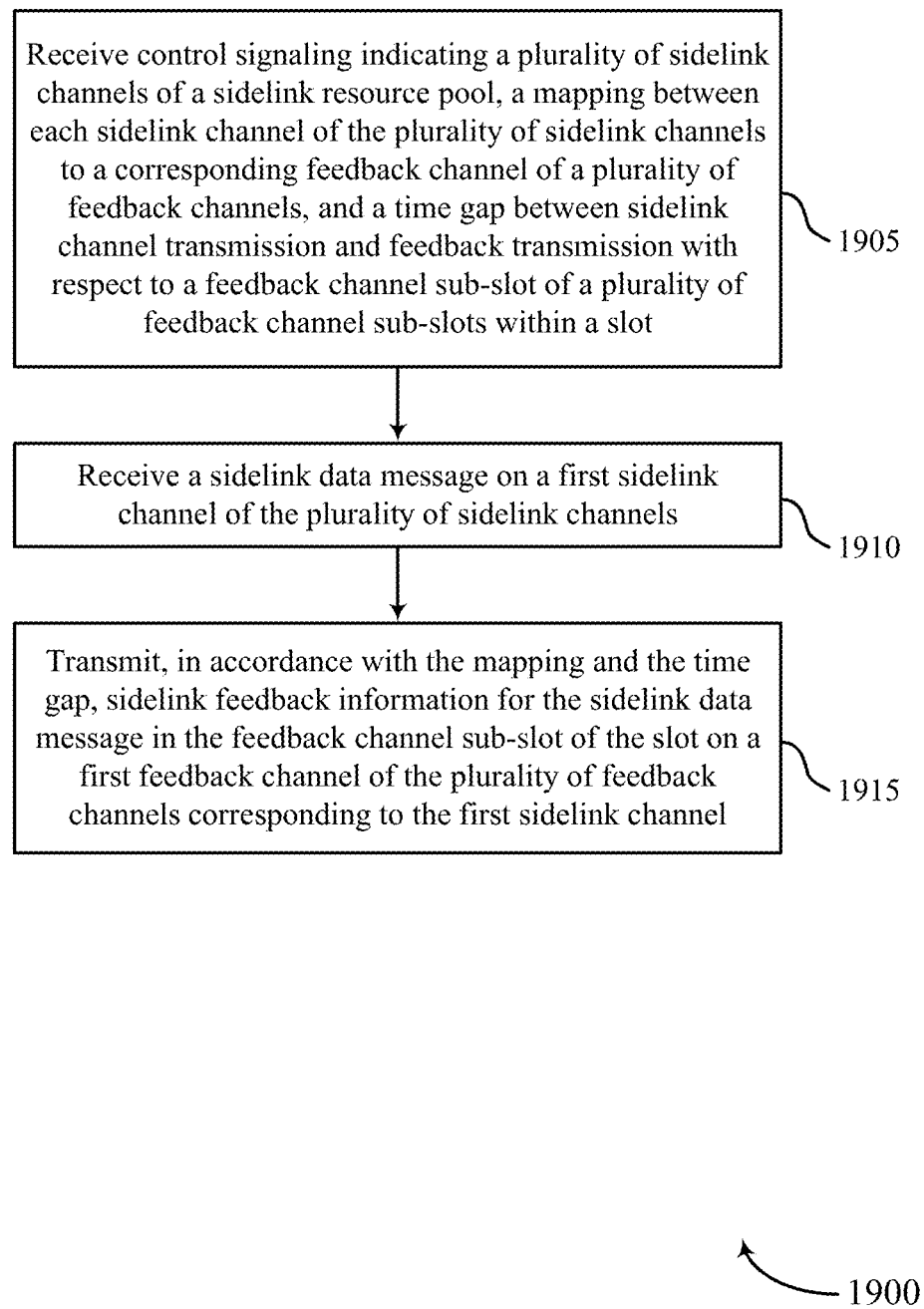
FIGS. 19 through 22 show flowcharts illustrating methods that support techniques for low-latency sidelink feedback transmission in accordance with aspects of the present disclosure.

FIG. 19 shows a flowchart illustrating a method 1900 that supports techniques for low-latency sidelink feedback transmission in accordance with aspects of the present disclosure. The operations of the method 1900 may be implemented by a wireless device (e.g., a UE or a base station) or its components as described herein. For example, the operations of the method 1900 may be performed by a wireless device as described with reference to FIGS. 1 through 18. In some examples, a wireless device may execute a set of instructions to control the functional elements of the wireless device to perform the described functions. Additionally or alternatively, the wireless device may perform aspects of the described functions using special-purpose hardware.

At 1905, the method may include receiving control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot. The operations of 1905 may be performed in accordance with examples as disclosed herein. In some examples, aspects of the operations of 1905 may be performed by a control signaling component 1725 as described with reference to FIG. 17.

At 1910, the method may include receiving a sidelink data message on a first sidelink channel of the plurality of sidelink channels. The operations of 1910 may be performed in accordance with examples as disclosed herein. In some examples, aspects of the operations of 1910 may be performed by a sidelink data component 1730 as described with reference to FIG. 17.

At 1915, the method may include transmitting, in accordance with the mapping and the time gap, sidelink feedback information for the sidelink data message in the feedback channel sub-slot of the slot on a first feedback channel of the plurality of feedback channels corresponding to the first sidelink channel. The operations of 1915 may be performed in accordance with examples as disclosed herein. In some examples, aspects of the operations of 1915 may be performed by a sidelink feedback component 1735 as described with reference to FIG. 17.

Figure 20:
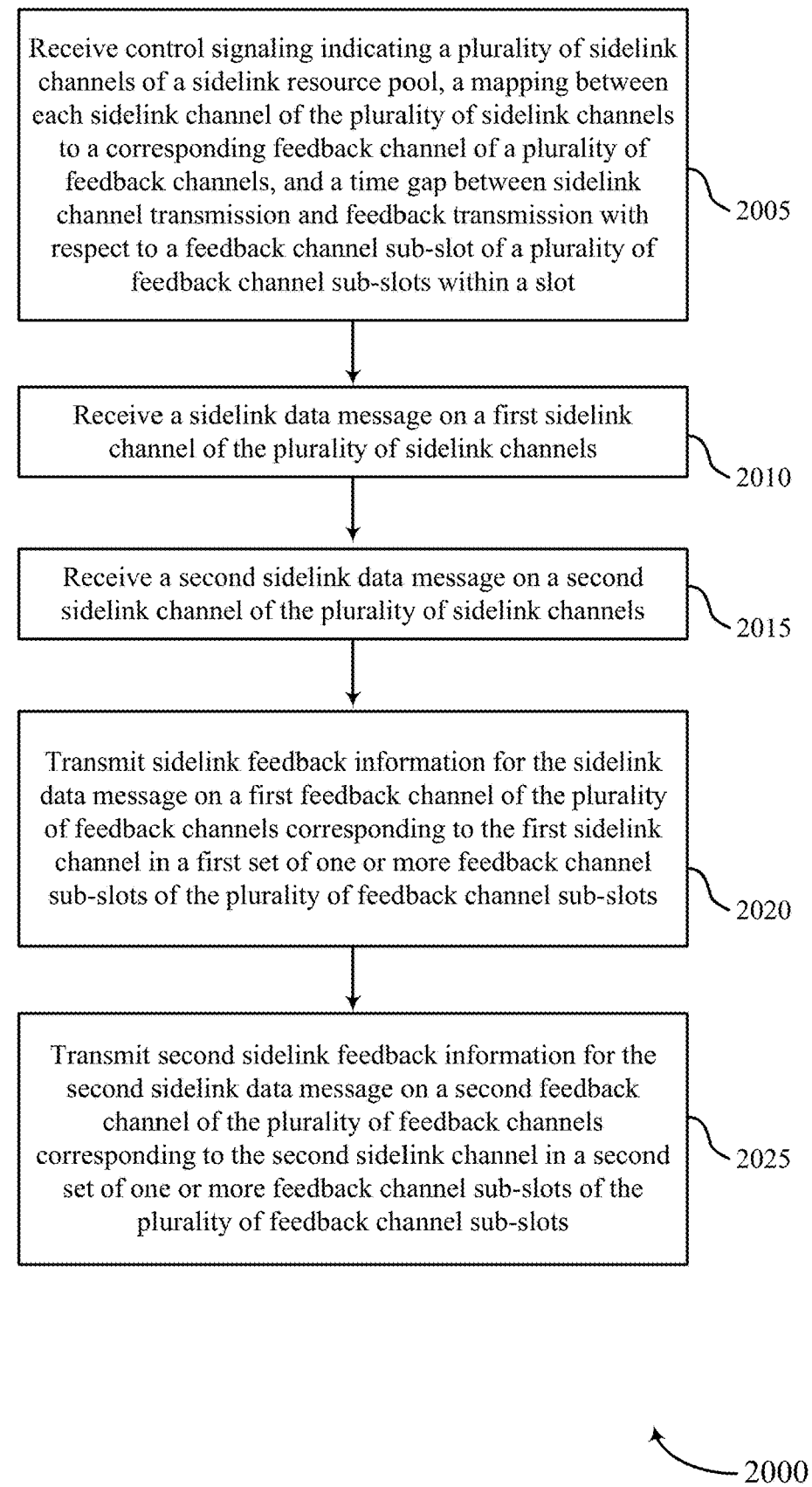

FIG. 20 shows a flowchart illustrating a method 2000 that supports techniques for low-latency sidelink feedback transmission in accordance with aspects of the present disclosure. The operations of the method 2000 may be implemented by a wireless device (e.g., a UE or a base station) or its components as described herein. For example, the operations of the method 2000 may be performed by a wireless device as described with reference to FIGS. 1 through 18. In some examples, a wireless device may execute a set of instructions to control the functional elements of the wireless device to perform the described functions. Additionally or alternatively, the wireless device may perform aspects of the described functions using special-purpose hardware.

At 2005, the method may include receiving control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot. The operations of 2005 may be performed in accordance with examples as disclosed herein. In some examples, aspects of the operations of 2005 may be performed by a control signaling component 1725 as described with reference to FIG. 17.

At 2010, the method may include receiving a sidelink data message on a first sidelink channel of the plurality of sidelink channels. The operations of 2010 may be performed in accordance with examples as disclosed herein. In some examples, aspects of the operations of 2010 may be performed by a sidelink data component 1730 as described with reference to FIG. 17.

At 2015, the method may include receiving a second sidelink data message on a second sidelink channel of the plurality of sidelink channels. The operations of 2015 may be performed in accordance with examples as disclosed herein. In some examples, aspects of the operations of 2015 may be performed by a sidelink data component 1730 as described with reference to FIG. 17.

At 2020, the method may include transmitting sidelink feedback information for the sidelink data message on a first feedback channel of the plurality of feedback channels corresponding to the first sidelink channel in a first set of one or more feedback channel sub-slots of the plurality of feedback channel sub-slots. The operations of 2020 may be performed in accordance with examples as disclosed herein. In some examples, aspects of the operations of 2020 may be performed by a sidelink feedback component 1735 as described with reference to FIG. 17.

At 2025, the method may include transmitting second sidelink feedback information for the second sidelink data message on a second feedback channel of the plurality of feedback channels corresponding to the second sidelink channel in a second set of one or more feedback channel sub-slots of the plurality of feedback channel sub-slots. The operations of 2025 may be performed in accordance with examples as disclosed herein. In some examples, aspects of the operations of 2025 may be performed by a sidelink feedback component 1735 as described with reference to FIG. 17.

Figure 21:
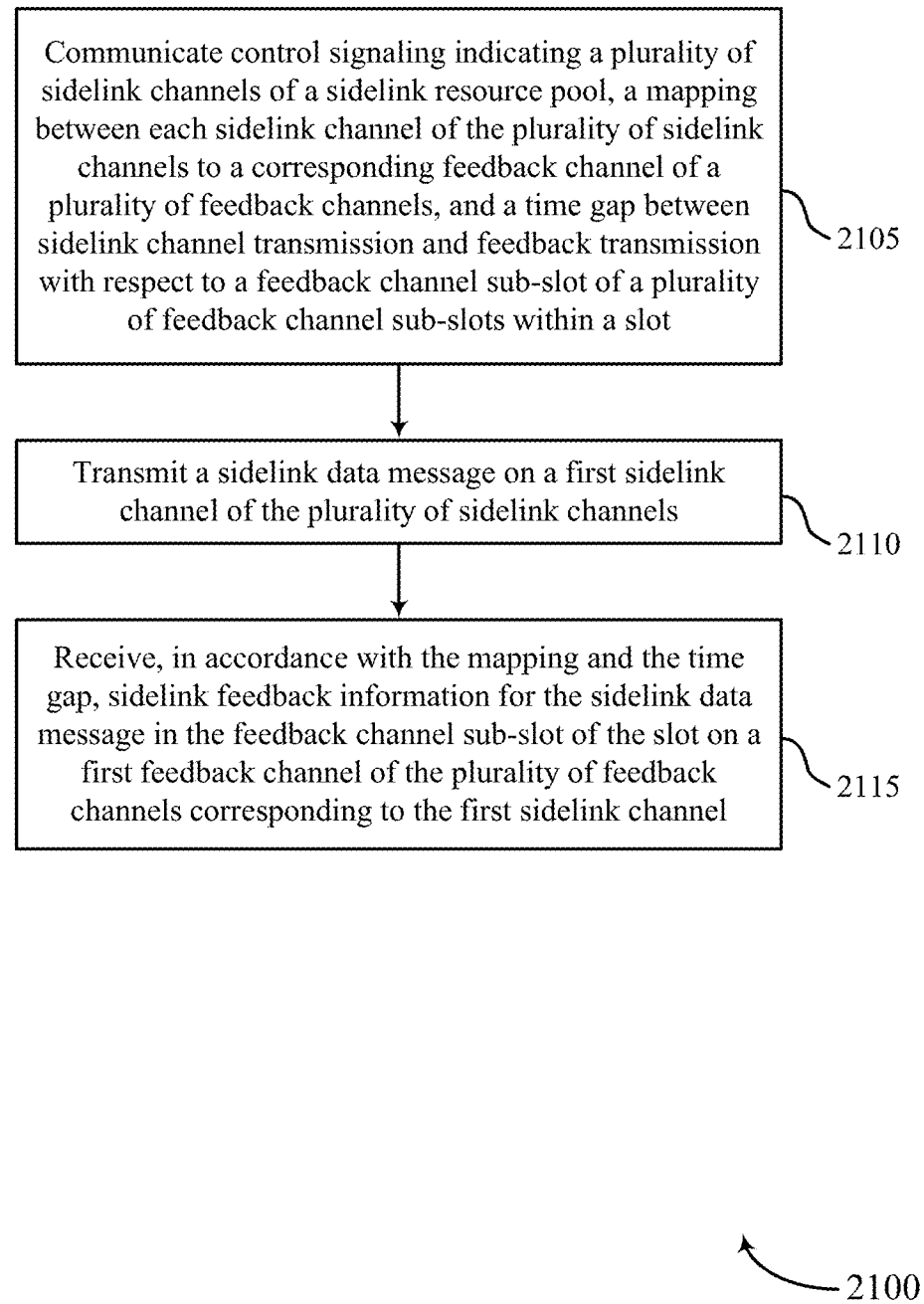

FIG. 21 shows a flowchart illustrating a method 2100 that supports techniques for low-latency sidelink feedback transmission in accordance with aspects of the present disclosure. The operations of the method 2100 may be implemented by a wireless device (e.g., a UE or a base station) or its components as described herein. For example, the operations of the method 2100 may be performed by a wireless device as described with reference to FIGS. 1 through 18. In some examples, a wireless device may execute a set of instructions to control the functional elements of the wireless device to perform the described functions. Additionally or alternatively, the wireless device may perform aspects of the described functions using special-purpose hardware.

At 2105, the method may include communicating control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot. The operations of 2105 may be performed in accordance with examples as disclosed herein. In some examples, aspects of the operations of 2105 may be performed by a communication component 1740 as described with reference to FIG. 17.

At 2110, the method may include transmitting a sidelink data message on a first sidelink channel of the plurality of sidelink channels. The operations of 2110 may be performed in accordance with examples as disclosed herein. In some examples, aspects of the operations of 2110 may be performed by a data transmission component 1745 as described with reference to FIG. 17.

At 2115, the method may include receiving, in accordance with the mapping and the time gap, sidelink feedback information for the sidelink data message in the feedback channel sub-slot of the slot on a first feedback channel of the plurality of feedback channels corresponding to the first sidelink channel. The operations of 2115 may be performed in accordance with examples as disclosed herein. In some examples, aspects of the operations of 2115 may be performed by a feedback reception component 1750 as described with reference to FIG. 17.

Figure 22:
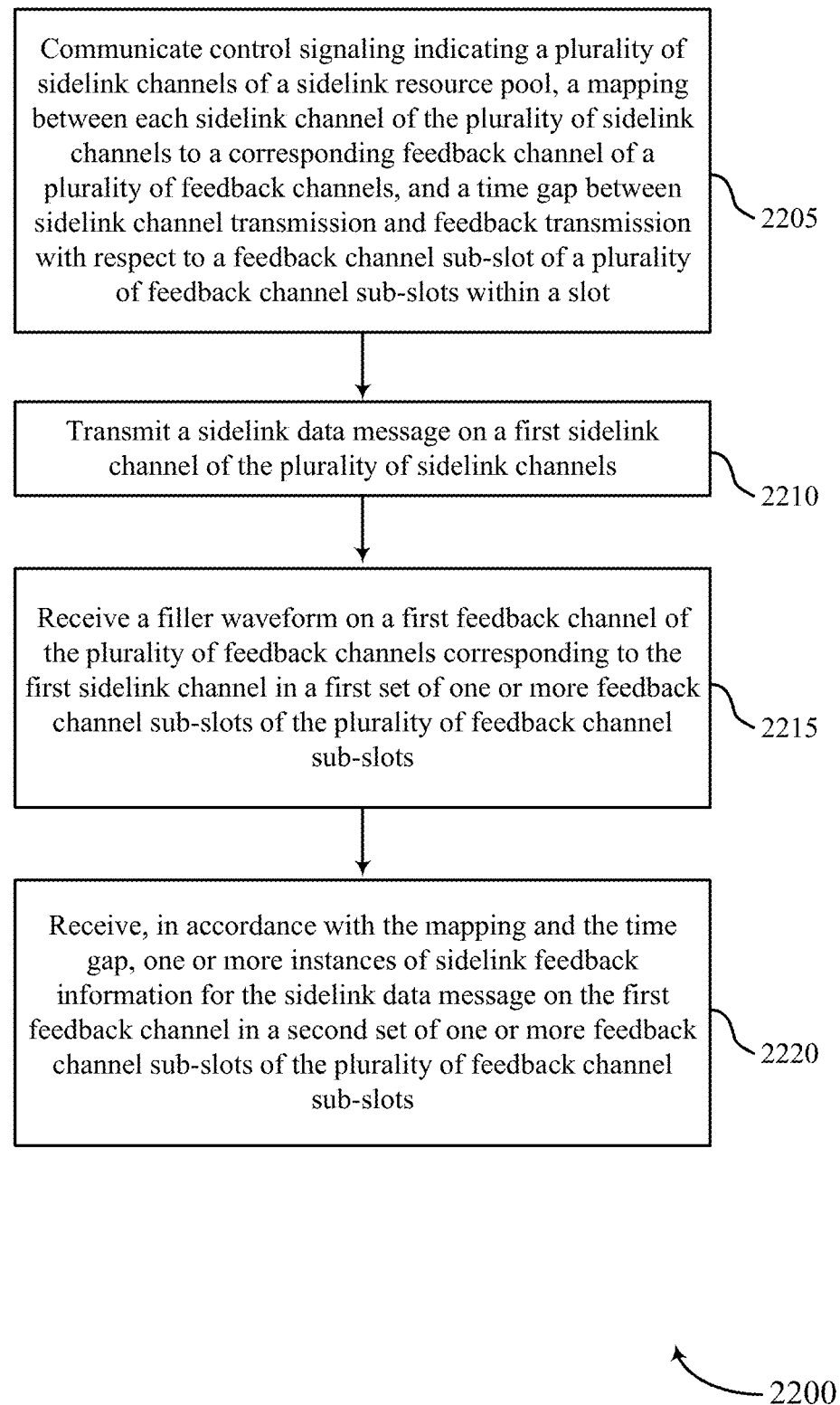

FIG. 22 shows a flowchart illustrating a method 2200 that supports techniques for low-latency sidelink feedback transmission in accordance with aspects of the present disclosure. The operations of the method 2200 may be implemented by a wireless device (e.g., a UE or a base station) or its components as described herein. For example, the operations of the method 2200 may be performed by a wireless device as described with reference to FIGS. 1 through 18. In some examples, a wireless device may execute a set of instructions to control the functional elements of the wireless device to perform the described functions. Additionally or alternatively, the wireless device may perform aspects of the described functions using special-purpose hardware.

At 2205, the method may include communicating control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot. The operations of 2205 may be performed in accordance with examples as disclosed herein. In some examples, aspects of the operations of 2205 may be performed by a communication component 1740 as described with reference to FIG. 17.

At 2210, the method may include transmitting a sidelink data message on a first sidelink channel of the plurality of sidelink channels. The operations of 2210 may be performed in accordance with examples as disclosed herein. In some examples, aspects of the operations of 2210 may be performed by a data transmission component 1745 as described with reference to FIG. 17.

At 2215, the method may include receiving a filler waveform on a first feedback channel of the plurality of feedback channels corresponding to the first sidelink channel in a first set of one or more feedback channel sub-slots of the plurality of feedback channel sub-slots. The operations of 2215 may be performed in accordance with examples as disclosed herein. In some examples, aspects of the operations of 2215 may be performed by a feedback reception component 1750 as described with reference to FIG. 17.

At 2220, the method may include receiving, in accordance with the mapping and the time gap, one or more instances of sidelink feedback information for the sidelink data message on the first feedback channel in a second set of one or more feedback channel sub-slots of the plurality of feedback channel sub-slots. The operations of 2220 may be performed in accordance with examples as disclosed herein. In some examples, aspects of the operations of 2220 may be performed by a feedback reception component 1750 as described with reference to FIG. 17.

The following provides an overview of aspects of the present disclosure:

Aspect 1: A method for wireless communications at a first wireless device, comprising: receiving control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot; receiving a sidelink data message on a first sidelink channel of the plurality of sidelink channels; and transmitting, in accordance with the mapping and the time gap, sidelink feedback information for the sidelink data message in the feedback channel sub-slot of the slot on a first feedback channel of the plurality of feedback channels corresponding to the first sidelink channel.

Aspect 2: The method of aspect 1, wherein at least one sidelink channel of the plurality of sidelink channels is frequency division multiplexed with at least one feedback channel of the plurality of feedback channels.

Aspect 3: The method of any of aspects 1 through 2, wherein transmitting the sidelink feedback information comprises: transmitting the sidelink feedback information for the sidelink data message on the first feedback channel and on a second feedback channel of the plurality of feedback channels corresponding to the first sidelink channel.

Aspect 4: The method of any of aspects 1 through 3, wherein transmitting the sidelink feedback information comprises: transmitting the sidelink feedback information that is a cyclically shifted.

Aspect 5: The method of any of aspects 1 through 4, wherein transmitting the sidelink feedback information comprises: transmitting, on the first feedback channel, the sidelink feedback information that is code division multiplexed with second sidelink feedback information for a second sidelink data message.

Aspect 6: The method of any of aspects 1 through 5, wherein receiving the sidelink data message comprises: receiving sidelink control information that is multiplexed with the sidelink data message, wherein the sidelink control information comprises an indication of a second time gap between sidelink channel transmission and feedback transmission with respect to a second feedback channel sub-slot of the plurality of feedback channel sub-slots.

Aspect 7: The method of aspect 6, wherein transmitting the sidelink feedback information comprises: transmitting, in accordance with the time gap, a first repetition of the sidelink feedback information on the first feedback channel in the feedback channel sub-slot; and transmitting, in accordance with the second time gap, a second repetition of the sidelink feedback information on the first feedback channel in the second feedback channel sub-slot.

Aspect 8: The method of any of aspects 1 through 7, wherein transmitting the sidelink feedback information comprises: transmitting first sidelink feedback information for a first portion of the sidelink data message on the first feedback channel in the feedback channel sub-slot based at least in part on a first attempt to perform early decoding of the sidelink data message; and transmitting second sidelink feedback information for a second portion of the sidelink data message on the first feedback channel in a second feedback channel sub-slot of the plurality of feedback channel sub-slots based at least in part on a second attempt to perform early decoding of the sidelink data message.

Aspect 9: The method of any of aspects 1 through 8, wherein receiving the sidelink data message comprises: receiving an indication of a symbol length for the sidelink data message, wherein the sidelink data message is received based at least in part on the symbol length.

Aspect 10: The method of any of aspects 1 through 9, wherein transmitting the sidelink feedback information comprises: transmitting a filler waveform on the first feedback channel in a first set of one or more feedback channel sub-slots of the plurality of feedback channel sub-slots; and transmitting one or more instances of the sidelink feedback information on the first feedback channel in a second set of one or more feedback channel sub-slots of the plurality of feedback channel sub-slots.

Aspect 11: The method of any of aspects 1 through 10, further comprising: receiving a second sidelink data message on a second sidelink channel of the plurality of sidelink channels; transmitting the sidelink feedback information for the sidelink data message on the first feedback channel in a first set of one or more feedback channel sub-slots of the plurality of feedback channel sub-slots; and transmitting second sidelink feedback information for the second sidelink data message on a second feedback channel of the plurality of feedback channels corresponding to the second sidelink channel in a second set of one or more feedback channel sub-slots of the plurality of feedback channel sub-slots.

Aspect 12: The method of any of aspects 1 through 11, wherein transmitting the sidelink feedback information comprises: transmitting a plurality of repetitions of the sidelink feedback information on the first feedback channel in two or more of the plurality of feedback channel sub-slots, wherein each feedback channel sub-slot of the plurality of feedback channel sub-slots comprises one or more symbol periods.

Aspect 13: The method of any of aspects 1 through 12, wherein the control signaling comprises a system information block, radio resource control signaling, sidelink control information, a medium access control (MAC) control element, or a combination thereof.

Aspect 14: The method of any of aspects 1 through 13, wherein each feedback channel of the plurality of feedback channels comprises at least a physical resource block within a feedback resource pool.

Aspect 15: The method of any of aspects 1 through 14, wherein receiving the control signaling comprises: receiving, from a second wireless device, control signaling indicating a time gap for each communication link of a plurality of communication links between the first wireless device and the second wireless device, a time gap for each physical sidelink shared channel instance of a plurality of physical sidelink shared channel instances, or a combination thereof.

Aspect 16: A method for wireless communications at a first wireless device, comprising: communicating control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot; transmitting a sidelink data message on a first sidelink channel of the plurality of sidelink channels; and receiving, in accordance with the mapping and the time gap, sidelink feedback information for the sidelink data message in the feedback channel sub-slot of the slot on a first feedback channel of the plurality of feedback channels corresponding to the first sidelink channel.

Aspect 17: The method of aspect 16, wherein communicating the control signaling comprises: transmitting, to a second wireless device, the control signaling indicating the mapping and the time gap.

Aspect 18: The method of aspect 16, wherein communicating the control signaling comprises: receiving, from a second wireless device, the control signaling indicating the mapping and the time gap.

Aspect 19: The method of any of aspects 16 through 18, wherein at least one sidelink channel of the plurality of sidelink channels is frequency division multiplexed with at least one feedback channel of the plurality of feedback channels.

Aspect 20: The method of any of aspects 16 through 19, wherein receiving the sidelink feedback information comprises: receiving, on the first feedback channel, the sidelink feedback information that is code division multiplexed with second sidelink feedback information for a second sidelink data message.

Aspect 21: The method of any of aspects 16 through 20, wherein transmitting the sidelink data message comprises: transmitting sidelink control information that is multiplexed with the sidelink data message, wherein the sidelink control information comprises an indication of a second time gap between sidelink channel transmission and feedback transmission with respect to a second feedback channel sub-slot of the plurality of feedback channel sub-slots.

Aspect 22: The method of aspect 21, wherein receiving the sidelink feedback information comprises: receiving, in accordance with the time gap, a first repetition of the sidelink feedback information on the first feedback channel in the feedback channel sub-slot; and receiving, in accordance with the second time gap, a second repetition of the sidelink feedback information on the first feedback channel in the second feedback channel sub-slot.

Aspect 23: The method of any of aspects 16 through 22, wherein receiving the sidelink feedback information comprises: receiving a filler waveform on the first feedback channel in a first set of one or more feedback channel sub-slots of the plurality of feedback channel sub-slots; and receiving one or more instances of the sidelink feedback information on the first feedback channel in a second set of one or more feedback channel sub-slots of the plurality of feedback channel sub-slots.

Aspect 24: The method of any of aspects 16 through 23, wherein receiving the sidelink feedback information comprises: receiving the sidelink feedback information on the first feedback channel and on a second feedback channel of the plurality of feedback channels corresponding to the first sidelink channel.

Aspect 25: The method of any of aspects 16 through 24, wherein receiving the sidelink feedback information comprises: receiving a plurality of repetitions of the sidelink feedback information on the first feedback channel in the plurality of feedback channel sub-slots, wherein each feedback channel sub-slot of the plurality of feedback channel sub-slots comprises one or more symbol periods.

Aspect 26: The method of any of aspects 16 through 25, wherein transmitting the sidelink data message comprises: transmitting the sidelink data message on the first sidelink channel in a first set of one or more sidelink channel sub-slots within a second slot, wherein the sidelink data message comprises an indication of a symbol length for the sidelink data message; and transmitting one or more padding bits on the first sidelink channel in a second set of one or more sidelink channel sub-slots within the second slot.

Aspect 27: The method of any of aspects 16 through 26, wherein the control signaling comprises a system information block, radio resource control signaling, sidelink control information, a medium access control (MAC) control element, or a combination thereof.

Aspect 28: An apparatus for wireless communications at a first wireless device, comprising at least one processor; memory coupled with the at least one processor; and instructions stored in the memory and executable by the at least one processor to cause the apparatus to perform a method of any of aspects 1 through 15.

Aspect 29: An apparatus for wireless communications at a first wireless device, comprising at least one means for performing a method of any of aspects 1 through 15.

Aspect 30: A non-transitory computer-readable medium storing code for wireless communications at a first wireless device, the code comprising instructions executable by at least one processor to perform a method of any of aspects 1 through 15.

Aspect 31: An apparatus for wireless communications at a first wireless device, comprising at least one processor; memory coupled with the at least one processor; and instructions stored in the memory and executable by the at least one processor to cause the apparatus to perform a method of any of aspects 16 through 27.

Aspect 32: An apparatus for wireless communications at a first wireless device, comprising at least one means for performing a method of any of aspects 16 through 27.

Aspect 33: A non-transitory computer-readable medium storing code for wireless communications at a first wireless device, the code comprising instructions executable by at least one processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software (e.g., executed by at least one processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or at least one general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or ascertaining, among other examples. Also, "determining" can include receiving (such as receiving information) or accessing (such as accessing data in a memory), among other examples. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot;
   receiving a first sidelink data message on a first sidelink channel of the plurality of sidelink channels and a second sidelink data message on a second sidelink channel of the plurality of sidelink channels;
   transmitting, in accordance with the mapping and the time gap, first sidelink feedback information for the first sidelink data message on a first feedback channel of the plurality of feedback channels corresponding to the first sidelink channel in a first set of one or more feedback channel sub-slots of the plurality of feedback channel sub-slots; and
   transmitting second sidelink feedback information for the second sidelink data message on a second feedback channel of the plurality of feedback channels corresponding to the second sidelink channel in a second set of one or more feedback channel sub-slots of the plurality of feedback channel sub-slots.

2. The method of claim 1, wherein at least one sidelink channel of the plurality of sidelink channels is frequency division multiplexed with at least one feedback channel of the plurality of feedback channels.

3. The method of claim 1, wherein transmitting the first sidelink feedback information comprises:
   transmitting the first sidelink feedback information for the first sidelink data message on the first feedback channel and on the second feedback channel of the plurality of feedback channels corresponding to the first sidelink channel.

4. The method of claim 1, wherein transmitting the first sidelink feedback information comprises:
   transmitting the first sidelink feedback information that is a cyclically shifted.

5. The method of claim 1, wherein transmitting the first sidelink feedback information comprises:
   transmitting, on the first feedback channel, the first sidelink feedback information that is code division multiplexed with the second sidelink feedback information for the second sidelink data message.

6. The method of claim 1, wherein receiving the first sidelink data message comprises:
   receiving sidelink control information that is multiplexed with the first sidelink data message, wherein the sidelink control information comprises an indication of a second time gap between sidelink channel transmission and feedback transmission with respect to an additional feedback channel sub-slot of the plurality of feedback channel sub-slots.

7. The method of claim 6, wherein transmitting the first sidelink feedback information comprises:

transmitting, in accordance with the time gap, a first repetition of the first sidelink feedback information on the first feedback channel in the feedback channel sub-slot; and transmitting, in accordance with the second time gap, a second repetition of the first sidelink feedback information on the first feedback channel in the additional feedback channel sub-slot.

8. The method of claim 1, wherein transmitting the first sidelink feedback information comprises:
transmitting the first sidelink feedback information for a first portion of the first sidelink data message on the first feedback channel in the feedback channel sub-slot based at least in part on a first attempt to perform early decoding of the first sidelink data message; and
transmitting third sidelink feedback information for a second portion of the first sidelink data message on the first feedback channel in an additional feedback channel sub-slot of the plurality of feedback channel sub-slots based at least in part on a second attempt to perform early decoding of the first sidelink data message.

9. The method of claim 1, wherein receiving the first sidelink data message comprises:
receiving an indication of a symbol length for the first sidelink data message, wherein the first sidelink data message is received based at least in part on the symbol length.

10. The method of claim 1, wherein transmitting the first sidelink feedback information comprises:
transmitting a filler waveform on the first feedback channel in the first set of one or more feedback channel sub-slots of the plurality of feedback channel sub-slots; and
transmitting one or more instances of the first sidelink feedback information on the first feedback channel in a third set of one or more feedback channel sub-slots of the plurality of feedback channel sub-slots.

11. The method of claim 1, wherein transmitting the first sidelink feedback information comprises:
transmitting a plurality of repetitions of the first sidelink feedback information on the first feedback channel in two or more of the plurality of feedback channel sub-slots, wherein each feedback channel sub-slot of the plurality of feedback channel sub-slots comprises one or more symbol periods.

12. The method of claim 1, wherein the control signaling comprises a system information block, radio resource control signaling, sidelink control information, a medium access control (MAC) control element, or a combination thereof.

13. The method of claim 1, wherein each feedback channel of the plurality of feedback channels comprises at least a physical resource block within a feedback resource pool.

14. The method of claim 1, wherein receiving the control signaling comprises:
receiving, from a second wireless device, control signaling indicating a time gap for each communication link of a plurality of communication links between the first wireless device and the second wireless device, a time gap for each physical sidelink shared channel instance of a plurality of physical sidelink shared channel instances, or a combination thereof.

15. A method for wireless communications at a first wireless device, comprising:
communicating control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot;
transmitting a first sidelink data message on a first sidelink channel of the plurality of sidelink channels and a second sidelink data message on a second sidelink channel of the plurality of sidelink channels;
receiving, in accordance with the mapping and the time gap, first sidelink feedback information for the first sidelink data message on a first feedback channel of the plurality of feedback channels corresponding to the first sidelink channel in a first set of one or more feedback channel sub-slots of the plurality of feedback channel sub-slots; and
receiving second sidelink feedback information for the second sidelink data message on a second feedback channel of the plurality of feedback channels corresponding to the second sidelink channel in a second set of one or more feedback channel sub-slots of the plurality of feedback channel sub-slots.

16. The method of claim 15, wherein communicating the control signaling comprises:
transmitting, to a second wireless device, the control signaling indicating the mapping and the time gap.

17. The method of claim 15, wherein communicating the control signaling comprises:
receiving, from a second wireless device, the control signaling indicating the mapping and the time gap.

18. The method of claim 15, wherein at least one sidelink channel of the plurality of sidelink channels is frequency division multiplexed with at least one feedback channel of the plurality of feedback channels.

19. The method of claim 15, wherein receiving the first sidelink feedback information comprises:
receiving, on the first feedback channel, the first sidelink feedback information that is code division multiplexed with the second sidelink feedback information for the second sidelink data message.

20. The method of claim 15, wherein transmitting the first sidelink data message comprises:
transmitting sidelink control information that is multiplexed with the first sidelink data message, wherein the sidelink control information comprises an indication of a second time gap between sidelink channel transmission and feedback transmission with respect to an additional feedback channel sub-slot of the plurality of feedback channel sub-slots.

21. The method of claim 20, wherein receiving the first sidelink feedback information comprises:
receiving, in accordance with the time gap, a first repetition of the first sidelink feedback information on the first feedback channel in the feedback channel sub-slot; and
receiving, in accordance with the second time gap, a second repetition of the first sidelink feedback information on the first feedback channel in the additional feedback channel sub-slot.

22. The method of claim 15, wherein receiving the first sidelink feedback information comprises:
receiving a filler waveform on the first feedback channel in the first set of one or more feedback channel sub-slots of the plurality of feedback channel sub-slots; and receiving one or more instances of the first sidelink feedback information on the first feedback channel in a third set of one or more feedback channel sub-slots of the plurality of feedback channel sub-slots.

23. The method of claim 15, wherein receiving the first sidelink feedback information comprises:
receiving the first sidelink feedback information on the first feedback channel and on the second feedback channel of the plurality of feedback channels corresponding to the first sidelink channel.

24. The method of claim 15, wherein receiving the first sidelink feedback information comprises:
receiving a plurality of repetitions of the first sidelink feedback information on the first feedback channel in the plurality of feedback channel sub-slots, wherein each feedback channel sub-slot of the plurality of feedback channel sub-slots comprises one or more symbol periods.

25. The method of claim 15, wherein transmitting the first sidelink data message comprises:
transmitting the first sidelink data message on the first sidelink channel in a first set of one or more sidelink channel sub-slots within a second slot, wherein the first sidelink data message comprises an indication of a symbol length for the first sidelink data message; and
transmitting one or more padding bits on the first sidelink channel in a second set of one or more sidelink channel sub-slots within the second slot.

26. The method of claim 15, wherein the control signaling comprises a system information block, radio resource control signaling, sidelink control information, a medium access control (MAC) control element, or a combination thereof.

27. An apparatus for wireless communications at a first wireless device, comprising:
at least one processor;
memory coupled with the at least one processor; and
instructions stored in the memory and executable by the at least one processor to cause the apparatus to:
receive control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot;
receive a first sidelink data message on a first sidelink channel of the plurality of sidelink channels and a second sidelink data message on a second sidelink channel of the plurality of sidelink channels;
transmit, in accordance with the mapping and the time gap, first sidelink feedback information for the first sidelink data message on a first feedback channel of the plurality of feedback channels corresponding to the first sidelink channel in a first set of one or more feedback channel sub-slots of the plurality of feedback channel sub-slots; and
transmit second sidelink feedback information for the second sidelink data message on a second feedback channel of the plurality of feedback channels corresponding to the second sidelink channel in a second set of one or more feedback channel sub-slots of the plurality of feedback channel sub-slots.

28. An apparatus for wireless communications at a first wireless device, comprising:
at least one processor;
memory coupled with the at least one processor; and
instructions stored in the memory and executable by the at least one processor to cause the apparatus to:
communicate control signaling indicating a plurality of sidelink channels of a sidelink resource pool, a mapping between each sidelink channel of the plurality of sidelink channels to a corresponding feedback channel of a plurality of feedback channels, and a time gap between sidelink channel transmission and feedback transmission with respect to a feedback channel sub-slot of a plurality of feedback channel sub-slots within a slot;
transmit a first sidelink data message on a first sidelink channel of the plurality of sidelink channels and a second sidelink data message on a second sidelink channel of the plurality of sidelink channels;
receive, in accordance with the mapping and the time gap, first sidelink feedback information for the first sidelink data message on a first feedback channel of the plurality of feedback channels corresponding to the first sidelink channel in a first set of one or more feedback channel sub-slots of the plurality of feedback channel sub-slots; and
receive second sidelink feedback information for the second sidelink data message on a second feedback channel of the plurality of feedback channels corresponding to the second sidelink channel in a second set of one or more feedback channel sub-slots of the plurality of feedback channel sub-slots.

29. The apparatus of claim 27, wherein at least one sidelink channel of the plurality of sidelink channels is frequency division multiplexed with at least one feedback channel of the plurality of feedback channels.

30. The apparatus of claim 28, wherein at least one sidelink channel of the plurality of sidelink channels is frequency division multiplexed with at least one feedback channel of the plurality of feedback channels.

* * * * *